(12) United States Patent
Konda

(10) Patent No.: US 12,184,203 B2
(45) Date of Patent: Dec. 31, 2024

(54) ELECTRIC-POWER CONVERSION APPARATUS

(71) Applicant: Mitsubishi Electric Corporation, Tokyo (JP)

(72) Inventor: Tomoko Konda, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 161 days.

(21) Appl. No.: 18/160,736

(22) Filed: Jan. 27, 2023

(65) Prior Publication Data

US 2023/0283202 A1    Sep. 7, 2023

(30) Foreign Application Priority Data

Mar. 4, 2022  (JP) .................. 2022-033118

(51) Int. Cl.
  *H02P 6/10*   (2006.01)
  *H02M 1/00*   (2006.01)
  *H02M 1/32*   (2007.01)
  *H02M 1/38*   (2007.01)
  *H02M 7/5387* (2007.01)
  *H02P 27/08*  (2006.01)

(52) U.S. Cl.
  CPC ....... *H02M 7/5387* (2013.01); *H02M 1/0009* (2021.05); *H02M 1/32* (2013.01); *H02M 1/385* (2021.05); *H02P 27/08* (2013.01)

(58) Field of Classification Search
  CPC .... H02M 7/5387; H02M 1/0009; H02M 1/32; H02M 1/385; H02M 1/088; H02M 7/53871; H02M 1/0054; H02P 27/08; H02P 27/085
  See application file for complete search history.

(56) References Cited

U.S. PATENT DOCUMENTS 5,650,708 A      7/1997  Sawada et al.
2004/0027083 A1  2/2004  Suzuki
(Continued)

FOREIGN PATENT DOCUMENTS

JP   6-62579 A    3/1994
JP   7-303302 A   11/1995
(Continued)

OTHER PUBLICATIONS

Japanese Office Action dated Feb. 7, 2023 in Japanese Application No. 2022-033118.

*Primary Examiner* — Muhammad S Islam
(74) *Attorney, Agent, or Firm* — Sughrue Mion, PLLC; Richard C. Turner

(57) ABSTRACT

There is provided an electric-power conversion apparatus in which a dead time can be set, while in an electric-power converter in which an AC current flows in a series circuit of switching devices, there is considered the effect of an error between a current value obtained for setting a dead time and an actual current value at a time of setting the dead time. An electric-power conversion apparatus, for a series circuit of each set, obtains a value of a current flowing in the series circuit is obtained; for an obtained current value, corrects a current error caused by a phase shift between a value of an actual current at a time when the dead time is set and the obtained current value; and set the dead time based on the corrected current value.

21 Claims, 13 Drawing Sheets

(56) References Cited

U.S. PATENT DOCUMENTS

| | | | |
|---|---|---|---|
| 2015/0077025 A1* | 3/2015 | Suzuki | H02P 6/10 318/400.02 |
| 2020/0169185 A1 | 5/2020 | Yamamoto et al. | |

FOREIGN PATENT DOCUMENTS

| | | |
|---|---|---|
| JP | 8-182347 A | 7/1996 |
| JP | 11-27951 A | 1/1999 |
| JP | 11-308704 A | 11/1999 |
| JP | 2002-330592 A | 11/2002 |
| JP | 2003-324928 A | 11/2003 |
| JP | 2010-142074 A | 6/2010 |
| JP | 6008930 B2 | 10/2016 |
| JP | 2018-182886 A | 11/2018 |

* cited by examiner

FIG. 5
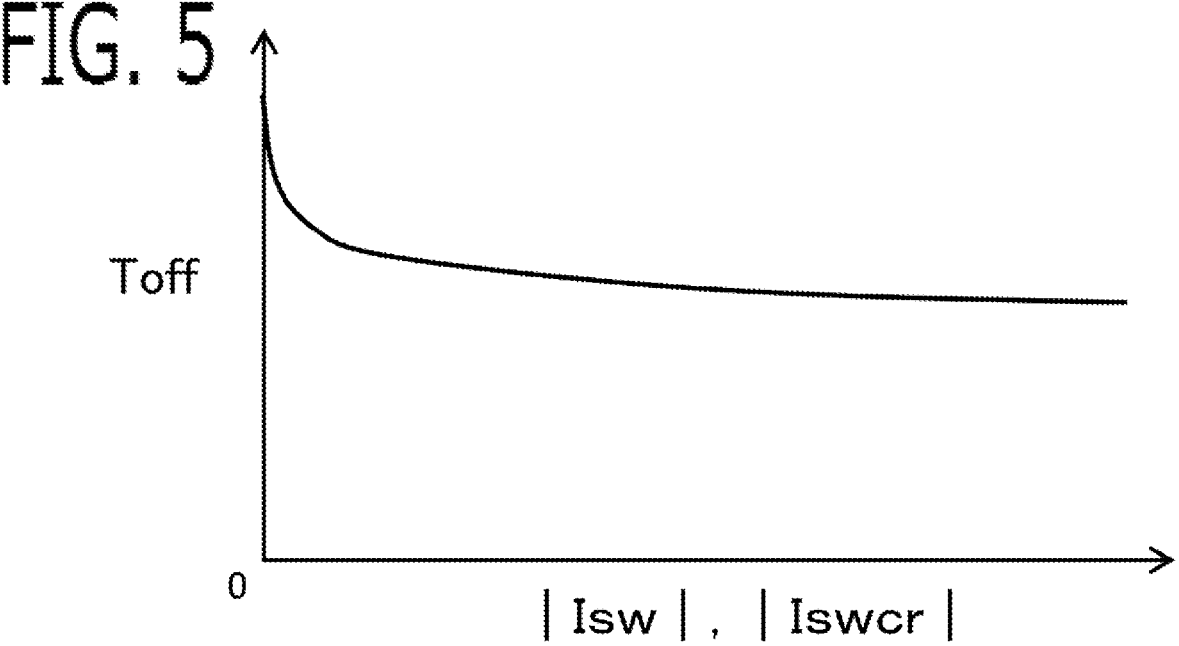
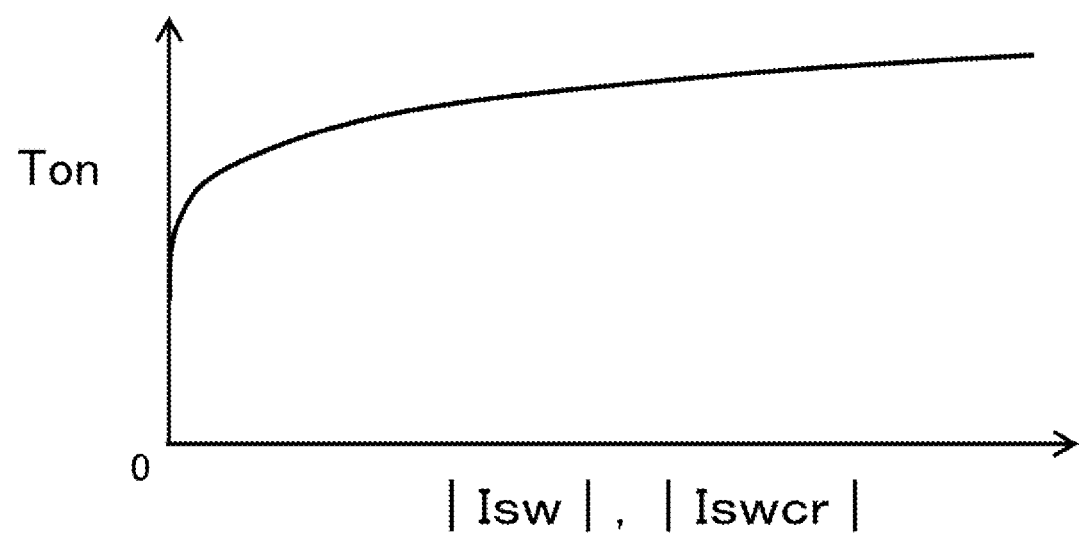
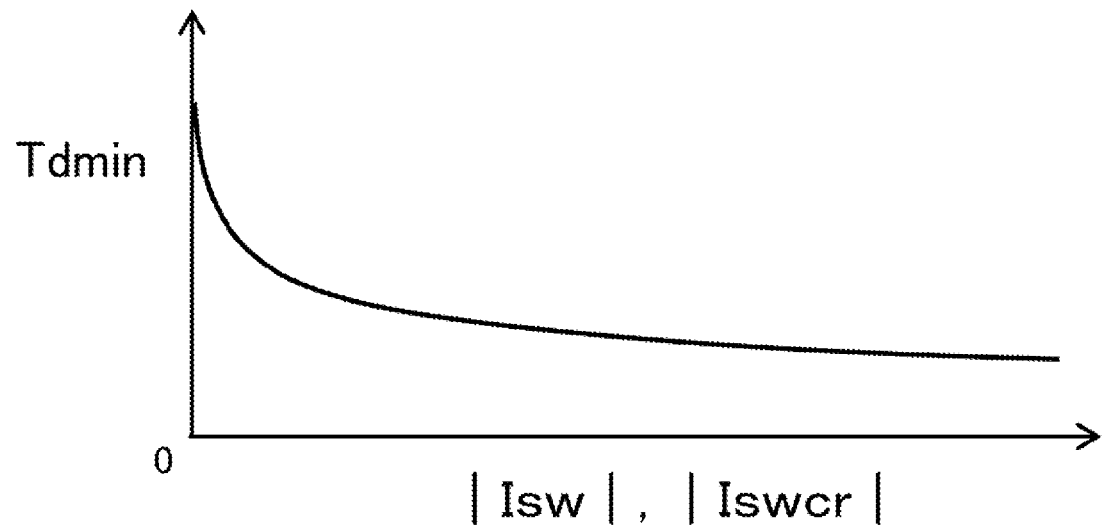

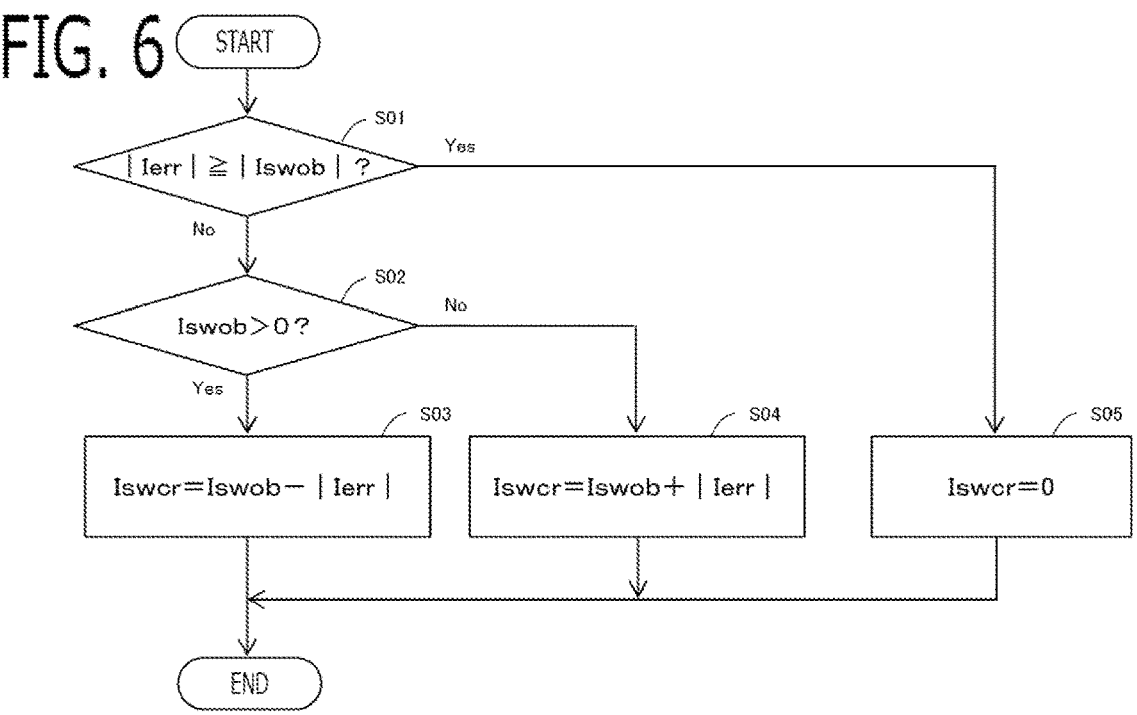
FIG. 6
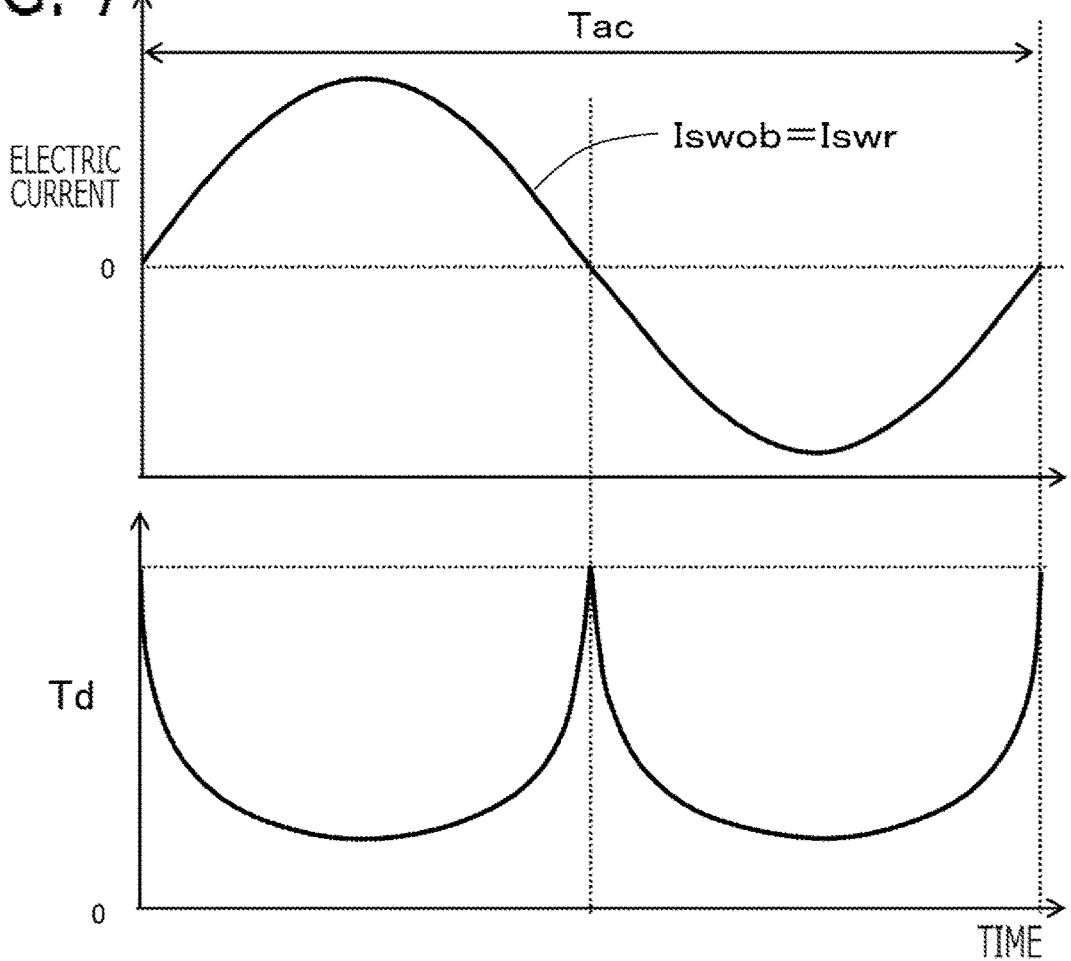
FIG. 7 COMPARATIVE EXAMPLE

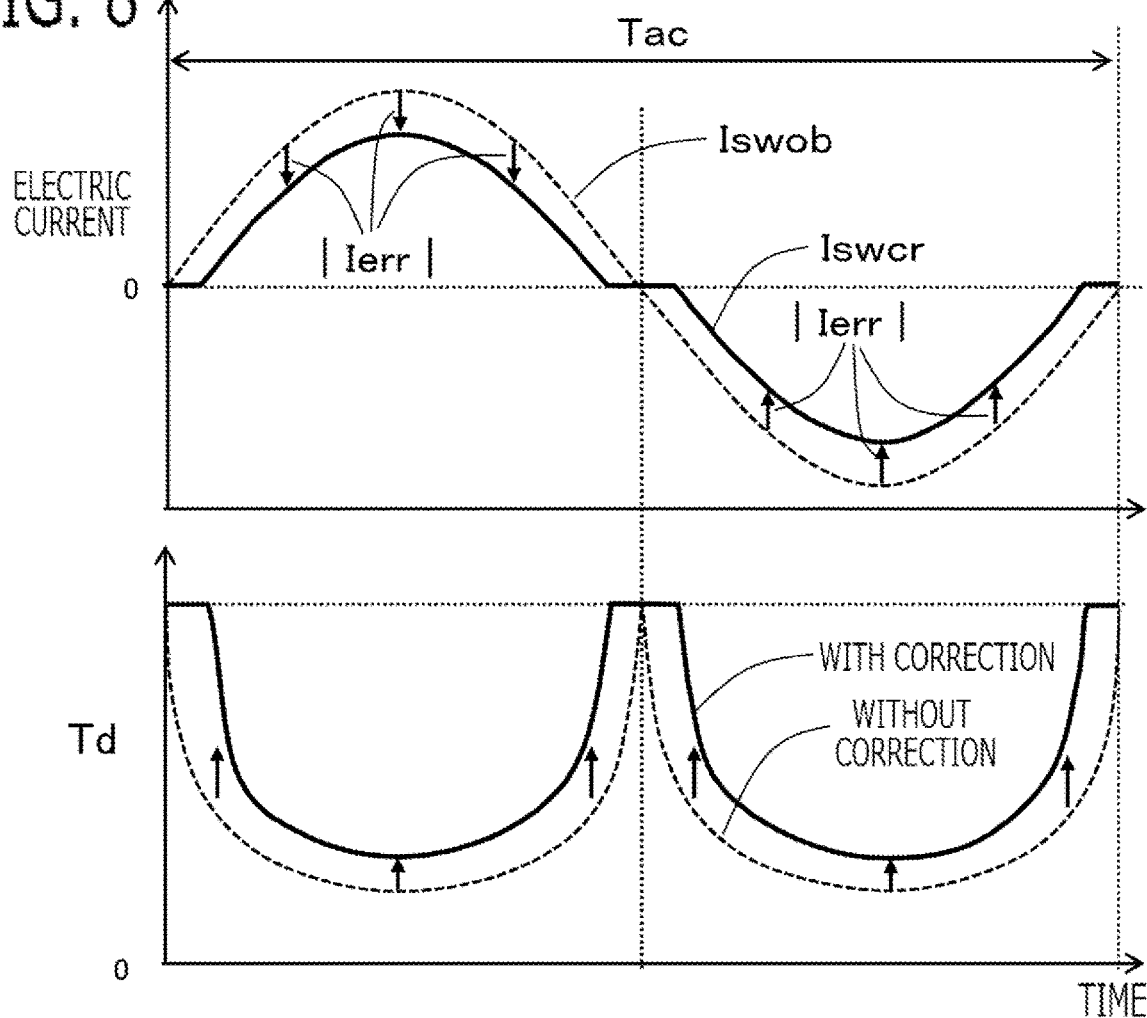

ELECTRIC-POWER CONVERSION APPARATUS

INCORPORATION BY REFERENCE

The disclosure of Japanese Patent Application No. 2022-33118 filed on Mar. 4, 2022 including its specification, claims and drawings, is incorporated herein by reference in its entirety.

BACKGROUND

The present disclosure relates to an electric-power conversion apparatus.

As an automobile with consideration for the environment, an automobile such as an HEV (Hybrid Electric Vehicle) or an EV (Electric Vehicle) that utilizes electric energy has widespread. In each of these vehicles, in order to supply AC electric power to an AC motor for driving vehicle wheels, an electric-power conversion apparatus that performs conversion between DC electric power and AC electric power is mounted. In recent years, further downsizing and efficiency enhancement (loss reduction) in an electric-power conversion apparatus have been required.

An electric-power conversion apparatus has two or more sets of series circuits in each of which a higher-potential-side switching device and a lower-potential-side switching device are connected in series with each other. Because when a switching device is turned on or off, there exists an on-delay or an off-delay, a higher-potential-side switching device and a lower-potential-side switching device are alternately turned on in such a way as to sandwich a dead time so that the higher-potential-side switching device and the lower-potential-side switching device do not turn on simultaneously.

In the case where as the switching device, an Si-MOSFET is utilized, a built-in PN diode having a large voltage drop is energized during the dead time; thus, there is posed an issue that in order to reduce the loss, the dead time should be shortened. In the case of a switching device utilizing a wide bandgap semiconductor, for example, a SiC-MOSFET, the basic operation thereof is the same as that of an Si-MOSFET; however, because a SiC-MOSFET has a high forward voltage caused by the bandgap of the SiC, the conduction loss during the dead time is large and hence there is posed an issue that the dead time should be shortened.

In addition, in order to downsize a capacitor to be provided in an electric-power conversion apparatus, regardless of the kind of a semiconductor switching device, it is required to raise the switching frequency; however, because when the switching frequency is raised, the proportion of the dead time to one period increases, the controllability is deteriorated; therefore, an issue of shortening the dead time is posed.

Accordingly, there has been proposed a method in which in order to shorten the dead time, the dead time is changed in accordance with a current that flows in the switching device. For example, in a technology disclosed in JP 6008930 B, the electric-power conversion apparatus has switching devices 5a through 5d, a current detection unit that detects respective currents Ids that flow in the switching devices 5a through 5d, and a controller 14 that controls the on/off of each of the switching devices 5a through 5d by applying a gate driving signal in which a dead time is set; in accordance with the current Ids, the controller 14 changes the proportion of the dead time to a switching period so that the dead time decreases as the current Ids increases.

For example, in a technology disclosed in JP 2010-142074 A, the control unit 10 for an electric-power conversion apparatus has an inverter 14 and a motor control unit 18 that sets a dead time so as to control the inverter 14. The motor control unit 18 has a map storage means 52 that stores a map representing the characteristics of a single turnoff delay time that increases as the during-driving both-end voltage of an IGBT in the inverter 14 increases, that decreases as the during-driving passing current of the IGBT increases, and that increases as the temperature of the IGBT increases and a correction means 58 that corrects the dead time, based on the characteristics of the single turnoff delay time, stored in the map storage means 52, and estimated during-driving both-end voltage and during-driving passing current of the IGBT.

SUMMARY

The electric-power conversion apparatus according to JP 6008930 B detects the respective currents Ids that flow in the switching devices 5a through 5d and performs control in such a way that the dead time decreases as the current Ids increases. However, in an electric-power conversion apparatus that converts AC electric power, an AC current flows in a series circuit of switching devices and changes from moment to moment. Due to a response delay in a current sensor, filtering processing, and the like, a current detection value changes with a phase delay with respect to an actual current value. In addition, processing for the on/off control of the switching device is performed every control period such as a carrier period or a PWM period. Accordingly, there occurs a processing delay time between a processing time point and a time point when the dead time is actually set. As a result, in the case where the dead time is changed based on an obtained current value, the actual current value at a time when the dead time is actually set has been changed from the obtained current value; thus, an error occurs in setting the dead time. In the case where due to the error, the dead time is set to become shorter, there occurs an arm short circuit in which the higher-potential-side switching device and the lower-potential-side switching device simultaneously turn on.

In the electric-power conversion apparatus according to JP 2010-142074 A, the dead time is controlled by storing a map representing the characteristics of a single turnoff delay time that increases as the during-driving both-end voltage of an IGBT in the inverter 14 increases, that decreases as the during-driving passing current of the IGBT increases, and that increases as the temperature of the IGBT increases. It is also described that correction is made by use of an actual measured value; however, because as is the case with the above, the current in the inverter is an AC current, the method utilizing only the map storage value and the corrected value thereof causes a setting error in the dead time.

Therefore, with regard to an electric-power conversion apparatus in which an AC current flows in a series circuit of switching devices, the objective of the present disclosure is to provide an electric-power conversion apparatus in which a dead time can be set, while there is considered the effect of an error caused by a phase shift between a current value obtained for setting a dead time and an actual current value at a time of setting the dead time.

An electric-power conversion apparatus according to the present disclosure includes
an electric-power converter that performs conversion between DC electric power and AC electric power and is provided with two or more sets of series circuits in each of which a higher-potential-side switching device connected with a higher-potential-side DC electric wire where the DC electric power flows and a lower-potential-side switching device connected with a lower-potential-side DC electric wire where the DC electric power flows are connected in series with each other and a connection point between the higher-potential-side switching device and the lower-potential-side switching device is connected with an AC electric wire where the AC electric power flows, a switching control unit that alternately turns on the higher-potential-side switching device and the lower-potential-side switching device in such a way as to sandwich a dead time, with regard to the series circuit for each of respective sets, and a dead time setting unit that sets the dead time.

With regard to the series circuit for each of the respective sets, the dead time setting unit obtains information on a value of a current that flows in the series circuit; with regard to an obtained current value, the dead time setting unit corrects a current error caused by a phase shift between a value of an actual current that flows in the series circuit at a time when the dead time is set and the obtained current value, and calculates a corrected current value; then, the dead time setting unit sets the dead time, based on the corrected current value.

In an electric-power conversion apparatus according to the present disclosure, a dead time is set, based on a corrected current value obtained by correcting a current error caused by a phase shift between an actual current value at a time when the dead time is set and an obtained current value; thus, because the error caused by a current-value phase shift can be suppressed from deteriorating the dead-time setting accuracy, the dead time can be set to be as short as possible in accordance with the corrected current value, while an arm short circuit is suppressed from occurring; as a result, the conduction loss can be reduced.

BRIEF DESCRIPTION OF THE DRAWINGS

FIG. 5 is a set of charts for explaining respective current dependencies of the ON delay time, the OFF delay time, and a minimum dead time according to Embodiment 1;

FIG. 6 is a flowchart for explaining current-value correction processing according to Embodiment 1;

FIG. 7 is a time chart for explaining setting of a dead time corresponding to a current value in an ideal state according to a comparative example;

FIG. 8 is a time chart for explaining current-value correction processing and setting of a dead time corresponding to a corrected current value according to Embodiment 1;

DETAILED DESCRIPTION OF THE EMBODIMENTS

1. Embodiment 1

Figure 1:
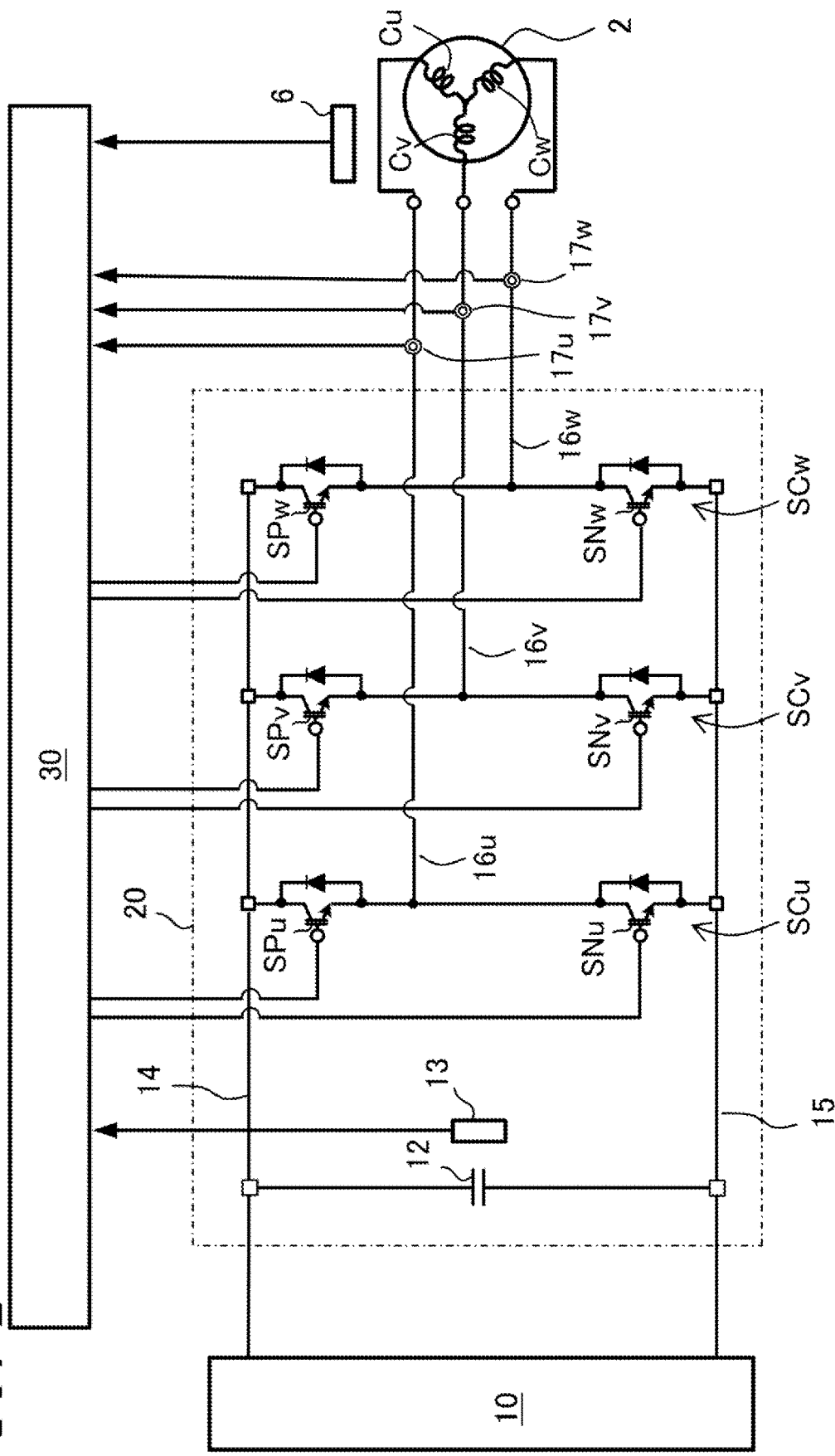
FIG. 1 is a schematic configuration diagram of an electric-power conversion apparatus according to Embodiment 1.

An electric-power conversion apparatus according to Embodiment 1 will be explained with reference to the drawings. FIG. 1 is a schematic configuration diagram of an electric-power converter 20 and a control apparatus 30 according to the present embodiment. In the present embodiment, AC electric power obtained through conversion by the electric-power converter 20 is supplied to armature windings of an AC motor 2.

1-1. AC Motor 2

The AC motor 2 is provided with a stator and a rotor disposed at the radially inside of the stator. Armature windings for two or more phases are provided in the stator. In the present embodiment, armature windings Cu, Cv, and Cw for three phases, i.e., U phase, V phase, and W phase are provided in the stator. The windings Cu, Cv, and Cw for the three phases are star-connected. The windings for the three phases may be delta-connected. The AC motor 2 is a permanent-magnet AC synchronous motor in which permanent magnets are provided in the rotor. In addition, the AC motor 2 may be either a magnetic-field-winding AC synchronous motor in which electromagnets are provided in the rotor or an induction AC motor in which an iron core is provided in the rotor.

The rotor is provided with a rotation sensor 6 for detecting the rotation angle of the rotor. An output signal of the rotation sensor 6 is inputted to the control apparatus 30. As the rotation sensor 6, any one of various kinds of sensors, such as a hole device, a resolver, and an encoder, is utilized. It may be allowed that the rotation sensor 6 is not provided and a rotation angle (magnetic-pole position) is estimated based on current information and the like to be obtained by superimposing harmonic components on an after-mentioned current command value (a so-called sensor-less method).

1-2. Electric-Power Converter 20

The electric-power converter 20 is the one for performing conversion between DC electric power and AC electric power. The electric-power converter 20 has two or more sets of series circuits SC in each of which a higher-potential-side switching device SP connected with a higher-potential-side DC electric wire 14 where DC electric power flows and a lower-potential-side switching device SN connected with a lower-potential-side DC electric wire 15 where DC electric power flows are connected in series with each other. In the series circuit SC in each of the sets, the connection point between the higher-potential-side switching device SP and the lower-potential-side switching device SN is connected with an AC electric wire 16 where AC electric power flows.

In the present embodiment, the higher-potential-side DC electric wire 14 is connected with the higher-potential side of a DC power source 10; the lower-potential-side DC electric wire 15 is connected with the lower-potential side of the DC power source 10. In addition, three sets of series circuits SCu, SCv, and SCw (hereinafter, referred to as the U-phase series circuit SCu, the V-phase series circuit SCv, and the W-phase series circuit SCw, respectively) are provided corresponding to the armature windings for the three phases.

Specifically, in the U-phase series circuit SCu, a U-phase higher-potential-side switching device SPu and a U-phase lower-potential-side switching device SNu are connected in series with each other and the connection point between the two switching devices is connected with a U-phase armature winding Cu through a U-phase AC electric wire 16$u$. In the V-phase series circuit SCv, a V-phase higher-potential-side switching device SPv and a V-phase lower-potential-side switching device SNv are connected in series with each other and the connection point between the two switching devices is connected with a V-phase armature winding Cv through a V-phase AC electric wire 16$v$. In the W-phase series circuit SCw, a W-phase higher-potential-side switching device SPw and a W-phase lower-potential-side switching device SNw are connected in series with each other and the connection point between the two switching devices is connected with a W-phase armature winding Cw through a W-phase AC electric wire 16$w$.

As the switching device, an IGBT (Insulated Gate Bipolar Transistor) with which a diode is connected in an anti-parallel manner, a MOSFET (Metal Oxide Semiconductor Field Effect Transistor) having the function of a diode connected therewith in an anti-parallel manner, a bipolar transistor with which a diode is connected in an anti-parallel manner, or the like is utilized. The gate terminal of each of the switching devices is connected with the control apparatus 30 through a gate driving circuit or the like. Each of the switching devices is turned on or off by a control signal to be outputted from the control apparatus 30.

In the present embodiment, the switching device is formed by use of a wide bandgap semiconductor. For example, a wide bandgap semiconductor is a SiC (silicon carbide)-based material, a GaN (gallium nitride)-based material, a diamond-based material, or the like. In addition, the switching device may be formed by use of a conventional Si (silicon) semiconductor.

The smoothing capacitor 12 is connected between the higher-potential-side DC electric wire 14 and the lower-potential-side DC electric wire 15. There is provided a power-source voltage sensor 13 that detects a DC voltage Vdc to be supplied from the DC power source 10 to the electric-power converter 20. The power-source voltage sensor 13 is connected between the higher-potential-side DC electric wire 14 and the lower-potential-side DC electric wire 15. The output signal of the power-source voltage sensor 13 is inputted to the control apparatus 30.

There is provided a current sensor 17 that detects a current flowing in the series circuit SC in each of the sets (the series circuit SC for each of the phases, in the present example). In the present embodiment, current sensors 17$u$, 17V, and 17$w$ for the respective phases are provided on the AC electric wires 16$u$, 16$v$, and 16$w$, respectively, for the respective phases, that connect the series circuits SC for the respective phases with the armature windings for the corresponding respective phases. The current sensor 17 is the one formed of a Hall device, a shunt resistor, or the like. The output signals of the current sensors 17 for the respective phases are inputted to the control apparatus 30. In addition, the current sensors 17 for the respective phases may be provided in the series circuits SC for the corresponding respective phases.

As the DC power source 10, a chargeable and dischargeable electric storage device (for example, a lithium ion battery, a nickel-hydrogen battery, or an electric double layer capacitor) is utilized. In addition, a DC-DC converter, which is a DC power converter that steps up or down a DC voltage, may be provided in the DC power source 10.

1-3. Control Apparatus

Figure 2:
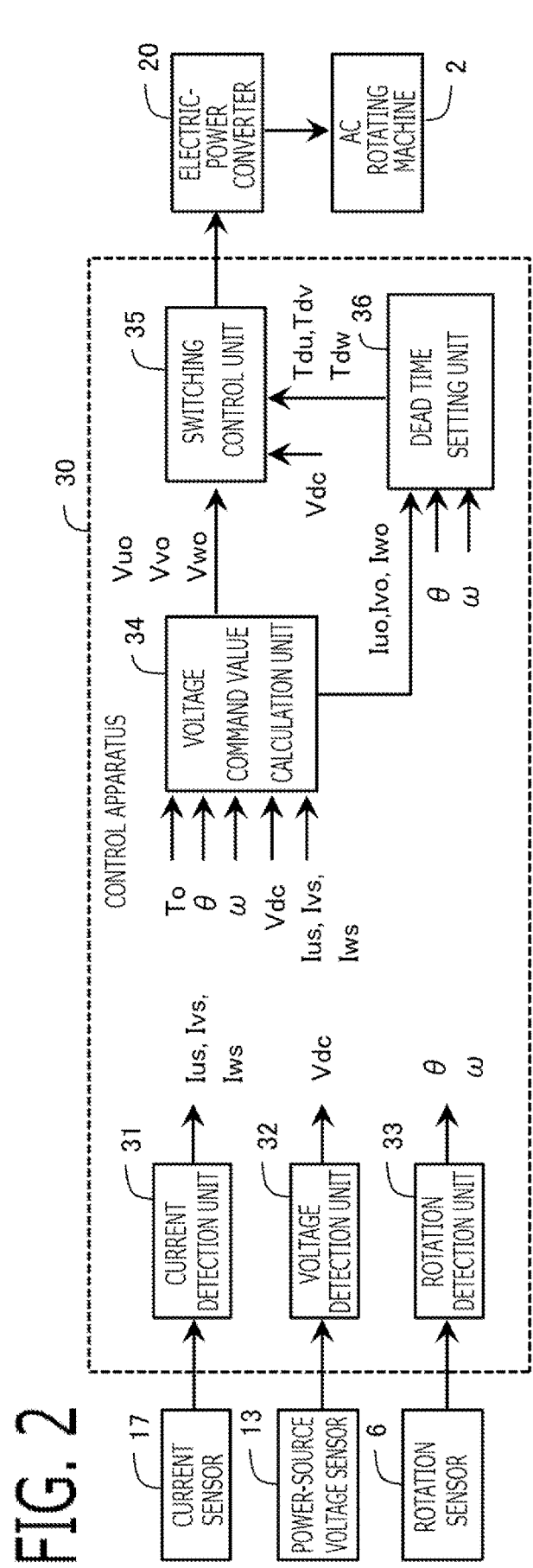
FIG. 2 is a schematic block diagram of a control apparatus according to Embodiment 1.
Figure 3:
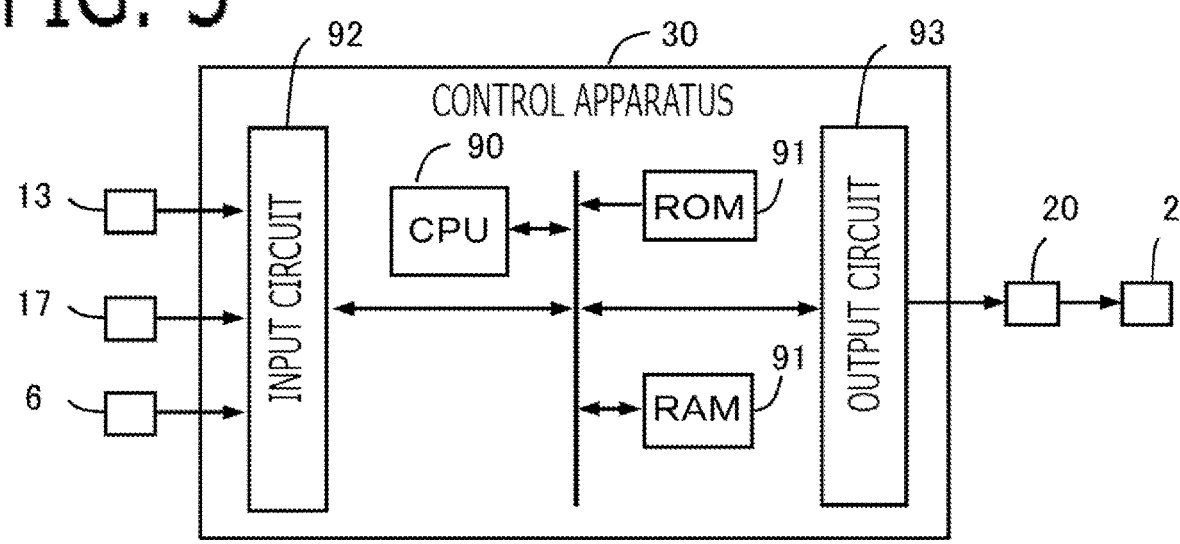
FIG. 3 is a hardware configuration diagram of the control apparatus according to Embodiment 1.

The control apparatus 30 controls the electric-power converter 20. In the present embodiment, the control apparatus 30 controls the electric-power converter 20 so as to control the AC motor 2. As represented in FIG. 2, the control apparatus 30 is provided with a current detection unit 31, a voltage detection unit 32, a rotation detection unit 33, a voltage command value calculation unit 34, a switching control unit 35, a dead time setting unit 36, and the like. Respective functions of the control apparatus 30 are realized by processing circuits provided in the control apparatus 30. Specifically, as illustrated in FIG. 3, the control apparatus 30 includes, as processing circuits, a computing processing unit (computer) 90 such as a CPU (Central Processing Unit), storage apparatuses 91 that exchange data with the computing processing unit 90, an input circuit 92 that inputs external signals to the computing processing unit 90, an output circuit 93 that outputs signals from the computing processing unit 90 to the outside, and the like. In the present embodiment, it is assumed that a microprocessor (MICON, hereinafter) is utilized.

It may be allowed that as the computing processing unit 90, an ASIC (Application Specific Integrated Circuit), an IC (Integrated Circuit), a DSP (Digital Signal Processor), an FPGA (Field Programmable Gate Array), any one of various kinds of logic circuits, any one of various kinds of signal processing circuits, or the like is provided. In addition, it may be allowed that as the computing processing unit 90, two or more computing processing units of the same type or different types are provided and respective processing items are implemented in a sharing manner. As the storage apparatuses 91, there are provided a RAM (Random Access Memory) that can read data from and write data in the computing processing unit 90, a ROM (Read Only Memory) that can read data from the computing processing unit 90, and the like. The input circuit 92 is connected with various kinds of sensors such as the power-source voltage sensor 13, the current sensor 17, and the rotation sensor 6 and is provided with an A/D converter and the like for inputting the output signals from the sensors to the computing processing unit 90. The output circuit 93 is connected with electric loads such as a gate driving circuit for on/off-driving the switching devices and the like, and is provided with a driving circuit and the like for outputting control signals from the computing processing unit 90 to these electric loads.

In addition, the computing processing unit 90 runs software items (programs) stored in the storage apparatus 91 such as a ROM and collaborates with other hardware devices in the control apparatus 30, such as the storage apparatus 91, the input circuit 92, and the output circuit 93, so that the respective functions of the control units 31 through 36 in FIG. 2 included in the control apparatus 30 are realized. In addition, setting data items to be utilized in the control units 31 through 36 are stored in the storage apparatus 91 such as a ROM. Hereinafter, the respective functions of the control apparatus 30 will be explained in detail.

1-3-1. Current Detection Unit 31

The current detection unit 31 detects currents Ius, Ivs, and Iws that flow in the respective armature windings for the three phases. In the present embodiment, based on the output signal of the current sensor 17, the current detection unit 31 detects the currents Ius, Ivs, and Iws that flow from the series circuits SC for the respective phases to the armature windings Cu, Cv, and Cw for the corresponding respective phases. In this situation, Ius is a U-phase current detection value; Ivs is a V-phase current detection value; Iws is a W-phase current detection value. In addition, it may be allowed that the current sensor 17 is configured in such a way as to detect the currents for two phases and the current for the remaining one phase is calculated based on the current detection values for the two phases. For example, it may be allowed that the current sensor 17 detects the V-phase current Ivs and the W-phase current Iws and the U-phase current Ius is calculated by the equation [Ius=−Ivs−Iws].

1-3-2. Voltage Detection Unit 32

The voltage detection unit 32 detects the DC voltage Vdc to be supplied from the DC power source 10 to the electric-power converter 20. In the present embodiment, the voltage detection unit 32 detects the DC voltage Vdc, based on the output signal of the power-source voltage sensor 13.

1-3-3. Rotation Detection Unit 33

The rotation detection unit 33 detects a rotation angle θ of the rotor (a magnetic-pole position θ of the rotor) and a rotation angular velocity ω of the rotor in the electric angle. In the present embodiment, the rotation detection unit 33 detects the rotation angle θ (the magnetic-pole position θ) and the rotation angular velocity ω in the electric angle, based on the output signal of the rotation sensor 6. The rotation angle θ is an N-pole (magnetic pole) angle (position) in the electric angle, when the u-phase armature winding is taken as a reference.

In addition, it may be allowed that the rotation sensor 33 is configured in such a way as to estimate the rotation angle θ (the magnetic-pole position θ), based on current information and the like to be obtained by superimposing harmonic components on a current command value, without utilizing any rotation sensor (a so-called sensor-less method).

1-3-4. Voltage Command Value Calculation Unit 34

The voltage command value calculation unit 34 calculates AC voltage command values Vuo, Vvo, and Vwo for the three phases to be applied to the armature windings for the three phases.

For example, in the calculation of the AC voltage command values for the three phases, there is utilized vector control in which a current is controlled on a rotating coordinate system consisting of a d axis and a q axis. The rotating coordinate system consisting of the d axis and the q axis is a two-axis rotating coordinate system consisting of the d axis defined in the direction of the N pole (magnetic-pole position θ) and the q axis defined in the direction advanced by the electric angle of 90° from the d axis.

The voltage command value calculation unit 34 transforms the current detection values Ius, Ivs, and Iws for the three phases into a d-axis current detection value Ids and a q-axis current detection value Iqs by performing a publicly known 3 phase-to-2 phase transformation and a rotating coordinate transformation based on the magnetic-pole position G. In addition, based on, for example, a torque command To or the like, the voltage command value calculation unit 34 calculates a d-axis current command value Ido and a q-axis current command value Iqo by use of any one of various kinds of publicly known methods. Then, based on the d-axis and q-axis current command values Ido and Iqo and the d-axis and q-axis current detection values Ids and Iqs, the voltage command value calculation unit 34 performs publicly known current feedback control so as to calculate a d-axis voltage command value Vdo and a q-axis voltage command value Vqo. In addition, it may be allowed that based on the d-axis and q-axis current command values Ido and Iqo, the voltage command value calculation unit 34 calculates the d-axis voltage command value Vdo and the q-axis voltage command value Vqo by means of publicly known current feedback control.

Then, based on the magnetic-pole position θ, the voltage command value calculation unit 34 applies publicly known fixed coordinate transformation and 2 phase-to-3 phase transformation to the d-axis and q-axis voltage command values Vdo and Vqo so as to calculate the AC voltage command values Vuo, Vvo, and Vwo for the three phases. In addition, it may be allowed that a publicly known modulation such as 2-phase modulation or a third harmonic superimposition is applied to the AC voltage command values for the three phases.

In addition, it may be allowed that the AC voltage command values for the three phases are calculated by use of another publicly known control method such as V/f control.

1-3-4. Switching Control Unit 35

With regard to the series circuit SC of each of the phases (sets), the switching control unit 35 alternately turns on the higher-potential-side switching device SP and the lower-potential-side switching device SN in such a way as to sandwich a dead time Td.

In the present embodiment, based on the AC voltage command values Vuo, Vvo, and Vwo for the respective phases, the switching control unit 35 turns on or off the higher-potential-side switching device SP and the lower-potential-side switching device SN by means of PWM control. The switching control unit 35 utilizes publicly known carrier-comparison PWM control, spatial-vector PWM control, or the like, as the PWM control.

In the case where the carrier-comparison PWM control is utilized, the switching control unit 35 compares a carrier wave with each of the AC voltage command values Vuo, Vvo, and Vwo for the respective phases and then creates control signals for turning on or off the higher-potential side and lower-potential-side switching devices for the respective phases, based on the comparison results. The carrier wave is a triangular wave that oscillates, in a PWM period, with an amplitude of the half value Vdc/2 of the DC voltage value with respect to the half value Vdc/2 of the DC voltage value. It may be allowed that instead of the triangular wave, an arbitrary wave such as a saw-tooth wave is utilized.

For example, letting the after-mentioned dead time Td be neglected; with regard to each of the respective phases, the switching control unit 35 turns on the control signal for the higher-potential-side switching device SP and turns off the control signal for the lower-potential-side switching device SN, when the carrier wave becomes lower than the voltage command value, and the switching control unit 35 turns off the control signal for the higher-potential-side switching device SP and turns on the control signal for the lower-potential-side switching device SN, when the carrier wave becomes higher than the voltage command value.

In the case where the spatial-vector PWM control is utilized, the switching control unit 35 creates voltage command vectors based on the AC voltage command values Vuo, Vvo, and Vwo for the three phases and then determines the output-time allocation of seven basic voltage vectors in the PWM period, based on the voltage command vectors; then, based on the output-time allocation of the seven basic voltage vectors, the switching control unit 35 creates control signals for turning on or off the respective switching devices in the PWM period.

<Dead Time Td>

With regard to each of the series circuits SC for the respective phases (sets), the switching control unit 35 turns off the control signal for the lower-potential-side switching device SN, when turning on the control signal for the higher-potential-side switching device SP based on the AC voltage command value, and turns on the control signal for the lower-potential-side switching device SN, when turning off the control signal for the higher-potential-side switching device SP based on the AC voltage command value.

Figure 4:
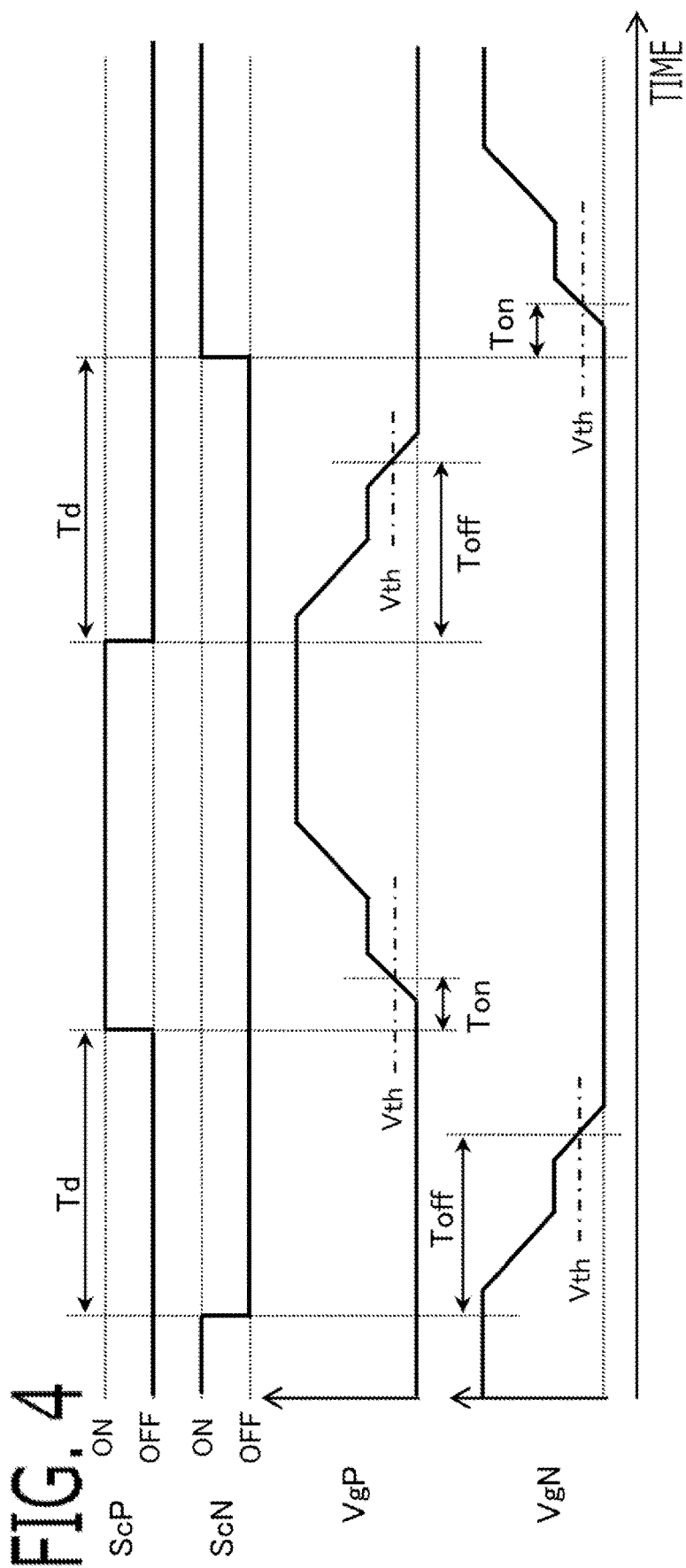
FIG. 4 is a timing chart for explaining an ON delay time, an OFF delay time, and a dead time according to Embodiment 1.

However, as represented in the timing chart in FIG. 4, there exists a delay time until the switching device actually turns on or off in response to a control signal Sc of the control apparatus 30. Specifically, after a control signal ScP for the higher-potential-side switching signal is turned on, there exists an ON delay time Ton until a gate voltage VgP to be applied to the gate terminal of the higher-potential-side switching device increases up to an ON voltage Vth and hence the higher-potential-side switching device SP actually turns on. In addition, after a control signal ScP for the higher-potential-side switching signal is turned off, there exists an OFF delay time Toff until the higher-potential-side gate voltage VgP decreases down to the ON voltage Vth and hence the higher-potential-side switching device SP actually turns off. Similarly, after a control signal ScN for the lower-potential-side switching signal is turned on, there exists the ON delay time Ton until a gate voltage VgN to be applied to the gate terminal of the lower-potential-side switching device increases up to the ON voltage Vth and hence the lower-potential-side switching device SN actually turns on. In addition, after the control signal ScN for the lower-potential-side switching signal is turned off, there exists the OFF delay time Toff until the lower-potential-side gate voltage VgN decreases down to the ON voltage Vth and hence the low-potential-side switching device SN actually turns off.

In order to prevent the ON delay time Ton and the OFF delay time Toff from making the higher-potential-side switching device SP and the lower-potential-side switching device SN simultaneously turn on, the dead time Td for turning off both the control signal ScP for the higher-potential-side switching device SP and the control signal ScN for the lower-potential-side switching device SN is provided between the ON period of the control signal ScP for the higher-potential-side switching device SP and the ON period of the control signal ScN for the lower-potential-side switching device SN. In other words, with regard to the series circuit SC of each of the phases (sets), the switching control unit 35 alternately turns on the higher-potential-side switching device SP and the lower-potential-side switching device SN in such a way as to sandwich the dead time Td. The dead time Td is set by the dead time setting unit 36, described later. Dead times Tdu, Tdv, and Tdw for the respective phases (sets) are set; then, the switching control unit 35 turns on or off the switching devices in the series circuits for the respective phases by use of the dead times Tdu, Tdv, and Tdw for the respective phases.

Various kinds of methods are utilized for realizing the dead time Td. For example, with regard to the series circuit SC of each of the phases (sets), the switching control unit 35 turns on the control signal ScN for the lower-potential-side switching device SN at a time when the dead time Td elapses after the control signal ScP for the higher-potential-side switching device SP has been turned off based on the AC voltage command value, and turns on the control signal ScP for the higher-potential-side switching device SP at a time when the dead time Td elapses after the control signal ScN for the lower-potential-side switching device SN has been turned off based on the AC voltage command value. Alternatively, there may be allowed a method in which with regard to the series circuit SC for each of the respective phases (sets), the switching control unit 35 creates an AC voltage command value to be utilized for creating the control signal ScP for the higher-potential-side switching device SP by decreasing the original AC voltage command value by the amount corresponding to the half of the dead time Td and creates an AC voltage command value to be utilized for creating the control signal ScN for the lower-potential-side switching device SN by increasing the original AC voltage command value by the amount corresponding to the half of the dead time Td.

1-3-5. Dead Time Setting Unit 36

<Current Dependency of Dead Time Td>

Because when the dead time Td is provided, there occur conduction loss, a control error in the PWM control, and shortening of the ON period, it is desirable to set the dead time Td to be a critical mass of time. As represented in the following equation, a minimum dead time Tdmin is theoretically the value obtained by subtracting the ON delay time Ton from the OFF delay time Toff.

$$Td\text{min} = T\text{off} - T\text{on} \qquad (1)$$

The OFF delay time Toff and the ON delay time Ton are set, while the characteristics of the switching device and the peripheral circuitry, variations, delay, and the like are considered. In general, in order to set the dead time Td at a safety side where no short circuit is caused, the OFF delay time Toff is set to a maximum value that can be obtained in a designed circuit, and the ON delay time Ton is set to a minimum value that can be obtained in the designed circuit. However, in this setting method, the current dependency of the dead time Td, caused by the characteristics of the switching device, is not considered and hence the dead time Td becomes a uniform value; thus, the conduction loss in the electric-power converter 20 becomes large. In order to improve the foregoing defect, there exists a method of shortening the dead time Td while considering the current dependency of the characteristics of the switching device. Hereinafter, there will be explained a dead time setting method, according to the present embodiment, that is performed by the dead time setting unit.

As represented in FIG. 5, each of the ON delay time Ton and the OFF delay time Toff changes in accordance with a current value |Isw| that flows in the switching device. As the current value |Isw| increases, the OFF delay time Toff decreases. As the current value |Isw| increases, the ON delay time Ton increases. Accordingly, as the current value |Isw| increases, the minimum dead time Tdmin decreases. In addition, in fact, each of the OFF delay time Toff and the ON delay time Ton slightly changes also depending on the voltage across the switching device and the temperature of the switching device; however, in the present embodiment, it is assumed that each of the voltage and the temperature thereof has the value with which the minimum dead time Tdmin becomes largest, and only the current dependency is taken into consideration.

Each of the ON delay time Ton and the OFF delay time Toff can be expressed by a function, represented in the equation below, that corresponds to the current value |Isw|

(absolute value); the minimum dead time Tdmin is calculated based on the current value |Isw|. In the equations below, K1, M1, N1, K2, M2, and N2 are coefficients that are preliminarily set based on experimental data and the like.

$$Toff(Isw)=K1 \times |Isw|^{M1}+N1$$

$$Ton(Isw)=K2 \times |Isw|^{M2}+N2$$

$$Tdmin(Isw)=Toff(Isw)-Ton(Isw)$$

$$Td(Isw)=Tdmin(Isw) \qquad (2)$$

<Setting of Dead Time Td Considering Current Error>

However, because the current value |Isw| that flows in the switching device (series circuit SC) is an AC current, detection delay, processing delay, or the like makes the current value |Isw| utilized in setting the dead time Td deviate from an actual current value |Iswr| at a time when the dead time Td at which the switching device is turned on or off is set. Moreover, in the case where a sensor error exists in the current detection value detected by the current sensor, the current value |Isw| utilized in setting the dead time Td deviates from the actual current value |Iswr|. Accordingly, there has been a problem that the setting accuracy for the dead time Td is deteriorated and hence a short circuit occurs.

Thus, with regard to the series circuit SC for each of the respective phases (sets), the dead time setting unit 36 obtains information on a value Iswob of a current (described in Paragraph 0064) that flows in the series circuit SC; with regard to the obtained current value Iswob, the dead time setting unit 36 corrects a current error between the obtained current value Iswob and the value |Iswr| of an actual current that flows in the series circuit SC at a time when the dead time Td is set (described in Paragraph 0055), and calculates a corrected current value Iswcr; then, the dead time setting unit 36 sets the dead time Td, based on the corrected current value Iswcr. In addition, corrected current values Iswcru, Iswcrv, and Iswcrw for the respective phases are calculated; based on the corrected current values Iswcru, Iswcrv, and Iswcrw for the respective phases, the dead times Tdu, Tdv, and Tdw for the respective phases (sets) are calculated; based on the dead times Tdu, Tdv, and Tdw for the respective phases, switching control of the series circuits SCu, SCv, and SCw for the respective phases is performed.

Because in this configuration, the dead time Td is set based on the corrected current value Iswcr obtained by correcting the current error between the obtained current value Iswob and the actual current value Iswr at a time when the dead time Td is set, the error in the current value can be suppressed from deteriorating the setting accuracy for the dead time Td; thus, it is made possible that while a short circuit is suppressed from being caused by the current error, the dead time can be set to be as short as possible in accordance with the corrected current value.

<Correction by Current-Error Correction Value |Ierr|>

In the present embodiment, with regard to the series circuit SC for each of the respective phases (sets), the dead time setting unit 36 calculates the corrected current value Iswcr by subtracting a positive current-error correction value |Ierr| from the obtained current value Iswob while performing lower limiting with "0", in the case where the obtained current value Iswob is larger than "0", and calculates the corrected current value Iswcr by adding the current-error correction value |Ierr| to the obtained current value Iswob while performing upper limiting with "0", in the case where the obtained current value Iswob is smaller than "0".

In this configuration, the obtained current value Iswob is made to approach "0" by the current-error correction value |Ierr|, so that the corrected current value Iswcr is calculated; then, based on the corrected current value Iswcr, the dead time Td is calculated. When the absolute value of the corrected current value Iswcr becomes smaller, the dead time Td becomes larger and hence the safety side where a short circuit can be prevented is realized. Accordingly, by means of the current-error correction value |Ierr|, the current value is corrected toward the safety side where a short circuit can be suppressed, so that the dead time Td can be set to be as short as possible in accordance with the corrected current value, while the current error is suppressed from causing a short circuit.

This processing can be configured by the flowchart represented in FIG. 6. The processing in FIG. 6 is performed for the series circuit SC for each of the respective phases (sets); then, the corrected current value Iswcr for each of the respective phases is calculated. In the step S01, the dead time setting unit 36 determines whether or not the current-error correction value |Ierr| is the same as or larger than the absolute value of the obtained current value Iswob; in the case where the current-error correction value |Ierr| is the same as or larger than the absolute value of the obtained current value Iswob, the step S01 is followed by the step S05; in the case where the current-error correction value |Ierr| is not the same as or larger than the absolute value of the obtained current value Iswob, the step S01 is followed by the step S02. In the step S05, the dead time setting unit 36 sets the corrected current value Iswcr to "0".

In the step S02, the dead time setting unit 36 determines whether or not the obtained current value Iswob is larger than "0"; in the case where the obtained current value Iswob is larger than "0", the step S02 is followed by the step S03; in the case where the obtained current value Iswob is not larger than "0", the step S02 is followed by the step S04. In the step S03, the dead time setting unit 36 calculates, as the corrected current value Iswcr, a value by subtracting the current-error correction value |Ierr| from the obtained current value Iswob.

On the other hand, in the step S04, the dead time setting unit 36 calculates, as the corrected current value Iswcr, a value by adding the current-error correction value |Ierr| to the obtained current value Iswob.

In the present embodiment, the dead time setting unit 36 calculates the dead time Td corresponding to the calculated corrected current value Iswcr, by use of a function for which the relationship between the corrected current value Iswcr and the dead time Td is preliminarily set.

For example, by use of the following equation corresponding to the equation (2), the dead time setting unit 36 calculates the dead time Td, based on the corrected current value Iswcr. In the equations below, K1, M1, N1, K2, M2, and N2 are coefficients that are preliminarily set based on experimental data and the like.

$$Toff(Iswcr)=K1 \times |Iswcr|^{M1}+N1$$

$$Ton(Iswcr)=K2 \times |Iswcr|^{M2}+N2$$

$$Tdmin(Iswcr)=Toff(Iswcr)-Ton(Iswcr)$$

$$Td(Iswcr)=Tdmin(Iswcr) \qquad (3)$$

Alternatively, it may be allowed that the dead time setting unit 36 calculates the dead time Td corresponding to the calculated corrected current value Iswcr, by referring to map data in which the relationship between the corrected current value Iswcr and the dead time Td is preliminarily set. The map data is preliminarily set based on an equation such as the equation (3) or experimental data. Alternatively, it may be allowed that a mathematical expression different from the equation (3) is utilized.

The time chart in FIG. 7 according to a Comparative Example represents a case where based on the obtained current value Iswob, the dead time Td is set in an ideal state where the obtained current value Iswob coincides with an actual current value Iswr at a time of the dead time Td. As represented in FIG. 7, because as the absolute value of the current value approaches "0", the dead time Td increases, the adverse effects of the dead time Td (conduction loss, a control error in the PWM control, shortening of the ON period, and the like) are reduced, while a short circuit is suppressed. However, in fact, due to detection delay, processing delay, a sensor error, or the like, there exists an error in the obtained current value Iswob. Accordingly, although the dead time Td can be set to be small, the current error may cause a short circuit.

In the present embodiment, as represented in the time chart in FIG. 8, the corrected current value Iswcr is calculated by making the obtained current value Iswob approach "0" by the current-error correction value |Ierr|, and the dead time Td is calculated based on the corrected current value Iswcr. As a result, the dead time Td is increased by the amount corresponding to the decrease in the absolute value of the current and is changed toward the safety side where the current error can be suppressed from causing a short circuit; concurrently, the dead time Td is changed in accordance with the corrected current value Iswcr. Accordingly, the dead time Td can be set to be as short as possible in accordance with the corrected current value, while the current error is suppressed from causing a short circuit.

<Obtainment of Current Value Iswob>

As described above, with regard to the series circuit SC for each of the respective phases (sets), the dead time setting unit 36 obtains information on the current value Iswob that flows in the series circuit SC. In the present embodiment, as the information items on the values Iswobu, Iswobv, and Iswobw of the currents that flow in the series circuits SC for the respective phases (sets), the dead time setting unit 36 obtains current command values Iuo, Ivo, and Iwo for the series circuits SC for the respective phases (sets). As represented by the following equation, based on the magnetic-pole position θ, the voltage command value calculation unit 34 applies publicly known fixed coordinate transformation and 2 phase-to-3 phase transformation to the d-axis current command value Ido and the q-axis current command value Iqo so as to calculate the current command values Iuo, Ivo, and Iwo for the three phases.

$$\begin{bmatrix} Iswobu \\ Iswobv \\ Iswobw \end{bmatrix} = \begin{bmatrix} Iuo \\ Ivo \\ Iwo \end{bmatrix} = \sqrt{\frac{2}{3}} \begin{bmatrix} 1 & 0 \\ -\frac{1}{2} & \frac{\sqrt{3}}{2} \\ -\frac{1}{2} & -\frac{\sqrt{3}}{2} \end{bmatrix} \begin{bmatrix} \cos\theta & -\sin\theta \\ \sin\theta & \cos\theta \end{bmatrix} \begin{bmatrix} Ido \\ Iuo \end{bmatrix} \quad (4)$$

Alternatively, it may be allowed that as the information items on the values Iswobu, Iswobv, and Iswobw of the currents that flow in the series circuits SC for the respective phases (sets), the dead time setting unit 36 obtains the current detection values Ius, Ivs, and Iws of the series circuits SC for the respective phases (sets).

<Calculation of Current-Error Correction Value |Ierr|>

The current-error correction value |Ierr| is the absolute value of an error between the obtained current value Iswob and the value Iswr of the actual current that flows in the series circuit SC at a time of the dead time Td; in the present embodiment, the current-error correction value |Ierr| is set to the maximum value of the current-value error that can occur. In the present embodiment, as explained hereinafter, the maximum value of the current-value error that can occur changes in accordance with an operating state; thus, the dead time setting unit 36 changes the current-error correction value |Ierr| in accordance with the operating state.

As described above, in the present embodiment, as the information items on the current values Iswob for the respective phases (sets), the dead time setting unit 36 obtains current command values Iuo, Ivo, and Iwo for the series circuits SC for the respective phases (sets). Meanwhile, the voltage command value calculation unit 34 performs current feedback control for changing the voltage command value so that on the rotating coordinate system consisting of the d axis and the q axis, the current detection value obtained by the current sensor coincides with the current command value. Accordingly, because due to the current feedback control, the current command value for each of the respective phases coincides with the current detection value for each of the respective phases, the error caused in the current detection value causes an error in the setting of the dead time Td, even when the current command value is utilized.

<Current Error Due to Current-Detection Delay>

Figure 9:
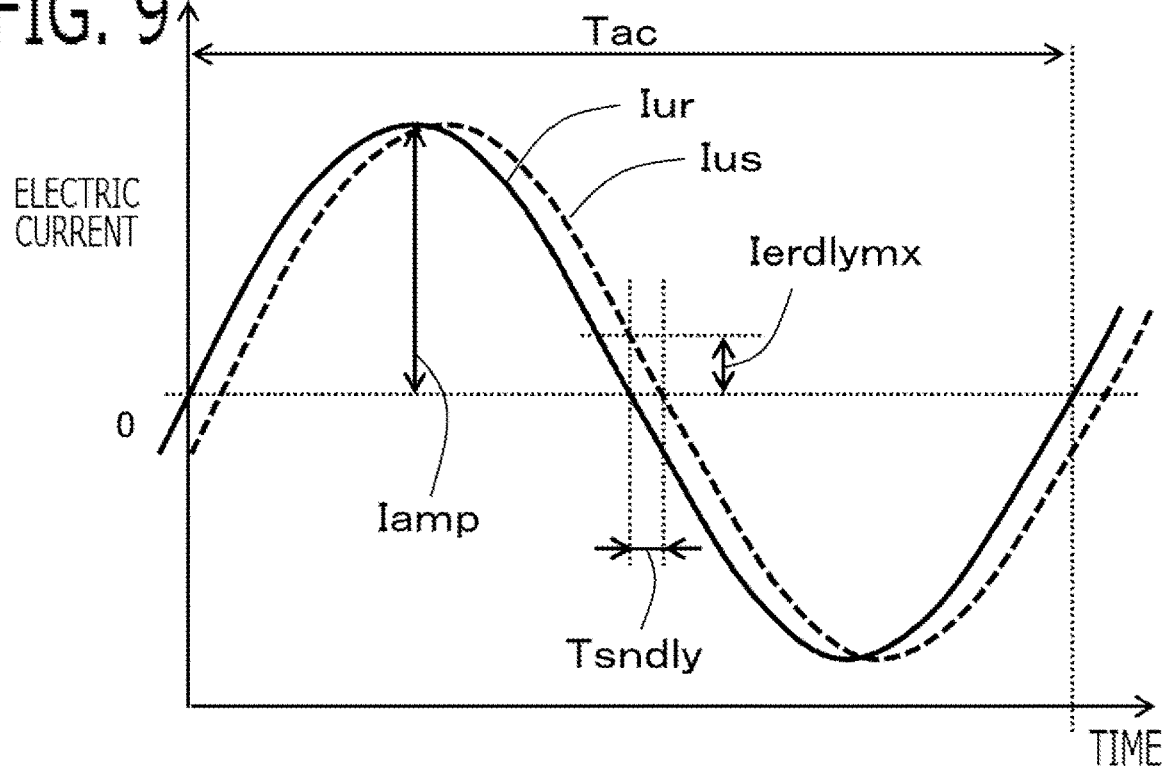
FIG. 9 is a time chart for explaining a maximum value of a current error caused by a current-detection delay time according to Embodiment 1.

The time chart in FIG. 9 represents a current value Iur of an actual U-phase current that flows in the U-phase series circuit SCu (the armature winding Cu) and the U-phase current detection value Ius detected by the U-phase current sensor 17u. Each of the respective currents for other phases has the same waveform. The U-phase current detection value Ius is delayed from the U-phase actual current value Iur, by a current-detection delay time Tsndly caused by a response delay of the current sensor, filtering processing, and the like. Because the current for each of the respective phases changes sinusoidally, the changing amount of the current per unit time becomes maximum at a time when the current for each of the respective phases approximates "0". Accordingly, when the current for each of the respective phases approximates "0", the current error becomes a maximum value Ierdlymx. The current-error maximum value Ierdlymx caused by the current-detection delay time Tsndly is expressed by the equation below. In the following equation, Iamp is the amplitude of the current for each of the respective phases. Tac is the AC period of the current for each of the respective phases; in the present embodiment, Tac is the electric-angle rotation period of the AC motor 2. The current-detection delay time Tsndly is preliminarily set through desk-top designing, while various delay factors are considered. The current-error maximum value Ierdlymx caused by the current-detection delay changes in accordance with the current amplitude Iamp and the AC period Tac.

$$Ierdlymx = Iamp \times \sin(Tsndly/Tac \times 2\pi) \quad (5)$$

<Current Error Caused by Offset Error of Current Sensor>

The current detection value obtained by the current sensor includes an offset error Ieroff in addition to the current error Ierdly caused by the response delay of the current sensor. The offset error Ieroff is a constant error that does not change depending on the current and that occurs in current measurement systems such as a current sensor and an A/D converter. The offset-error maximum value Ieroffmx is preliminarily set through desk-top designing, after the maximum offset caused by production errors and aging changes among the current measurement systems and the like has been preliminarily comprehended.

<Current Error Due to Processing Delay>

Current-detection processing and processing for calculating the AC voltage command value, to be utilized in setting the on/off timing for the switching device, are performed every predetermined control period Tcnt (the carrier period or the PWM period, in this example); there occurs a processing delay time between a time of processing and a time when the dead time Td is actually set. The processing delay time changes in accordance with the setting timing of the dead time Td in the control period Tcnt; the maximum value of the processing delay time becomes the control period Tcnt (the carrier period or the PWM period, in this example). As is the case with the current-error maximum value Ierdlymx caused by the current-detection delay, the current error caused by the processing delay becomes maximum at a time when the current for each of the respective phases approximates "0"; a current-error maximum value Ierprmx caused by the processing delay is expressed by the following equation. The current-error maximum value Ierprmx caused by the processing delay changes in accordance with the current amplitude Iamp and the AC period Tac. In the case where the control period Tcnt is variable, the current-error maximum value Ierprmx caused by the processing delay changes in accordance with the control period Tcnt.

$$Ierprmx = Iamp \times \sin(Tcnt/Tac \times 2\pi) \quad (6)$$

<Total Current Error>

A total current error Ierall obtained by summing the tree current-error maximum values Ierdlymx, Ieroffmx, and Ierprmx is expressed by the following equation; the current-error correction value |Ierr| can be set to the total current error Ierall. In addition, each of the current-error maximum values Ierdlymx, Ieroffmx, and Ierprmx becomes a positive value.

$$Ierall = Ierdlymx + Ieroffmx + Ierprmx$$

$$||Ierr| = Ierall \quad (7)$$

Figure 10:
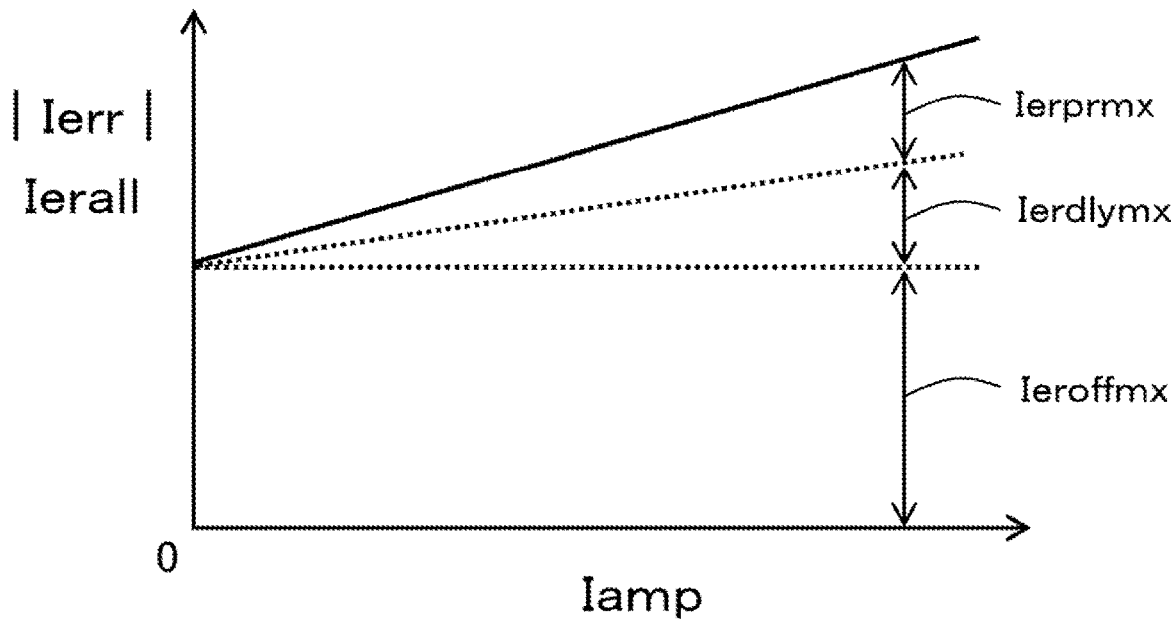
FIG. 10 is a chart for explaining setting of a correction value for a current error based on an amplitude of a current according to Embodiment 1.
Figure 11:
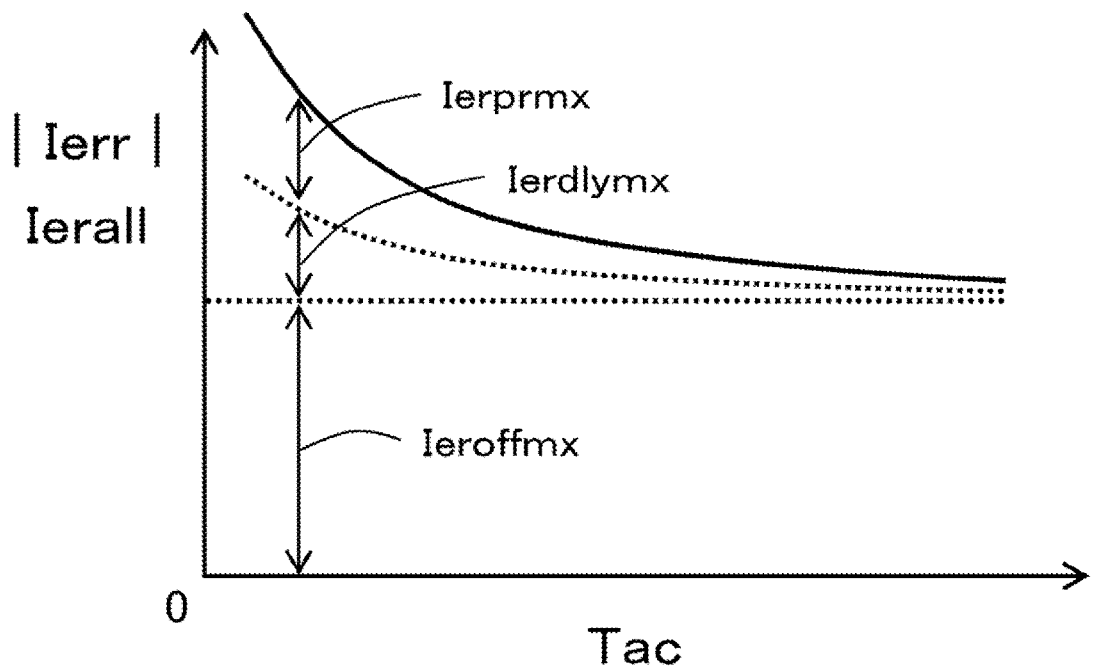
FIG. 11 is a chart for explaining setting of a correction value for a current error based on an AC period according to Embodiment 1.

Among these current-error maximum values, each of the current-error maximum value Ierdlymx caused by the current-detection delay and the current-error maximum value Ierprmx caused by the processing delay changes in accordance with the current amplitude Iamp and the AC period Tac. Under the condition that the AC period Tac is constant, the total current error Ierall changes in accordance with the current amplitude Iamp, as represented in FIG. 10. In addition, under the condition that the current amplitude Iamp is constant, the total current error Ierall changes in accordance with the AC period Tac, as represented in FIG. 11. In the case where the control period Tcnt is variable, the total current error Ierall changes in accordance with the control period Tcnt. In addition, the current-detection delay time Tsndly corresponds to "an obtainment delay time that is a delay time caused by obtaining information on a value of a current flowing in a series circuit".

<Change in Current-Error Correction Value |Ierr| in Accordance with Current Amplitude Iamp>

Accordingly, in the present embodiment, the dead time setting unit 36 changes the current-error correction value |Ierr|, based on the amplitude Iamp of a current that flows in the series circuit SC for each of the respective phases (sets). As represented in FIG. 10, the dead time setting unit 36 increases the current-error correction value |Ierr|, as the current amplitude Iamp increases. As explained by use of the equations (5) and (6), this configuration makes it possible to change the current-error correction value |Ierr| in accordance with the current-error maximum value Ierdlymx, caused by the current-detection delay, and the current-error maximum value Ierprmx, caused by the processing delay, that each change in accordance with the current amplitude Iamp. Accordingly, the dead time Td can be set to be as short as possible in accordance with the corrected current value, while the current error that changes in accordance with the current amplitude Iamp is suppressed from causing a short circuit.

When the current amplitude Iamp is "0", the dead time setting unit 36 sets the dead time Td to a maximum value that can occur in the electric-power conversion apparatus.

The dead time setting unit 36 calculates the current amplitude Iamp, based on the current detection value or the current command value. For example, the dead time setting unit 36 calculates the respective current-vector magnitudes of the d-axis and q-axis current detection values or the d-axis and q-axis current command values and then calculates the current amplitude Iamp, based on the current-vector magnitudes. Alternatively, it may be allowed that the dead time setting unit 36 determines the maximum value and the minimum value of the current detection value or the current command value for each of the respective phases in the AC period Tac and then calculates the current amplitude Iamp, based on the difference between the maximum value and the minimum value.

<Change in Current-Error Correction Value |Ierr| in Accordance with AC Period Tac>

In addition, the dead time setting unit 36 changes the current-error correction value |Ierr|, based on the AC period Tac of a current that flows in the series circuit SC for each of the respective phases (sets). As represented in FIG. 11, the dead time setting unit 36 increases the current-error correction value |Ierr|, as the AC period Tac decreases.

As explained by use of the equations (5) and (6), this configuration makes it possible to change the current-error correction value |Ierr| in accordance with the current-error maximum value Ierdlymx, caused by the current-detection delay, and the current-error maximum value Ierprmx, caused by the processing delay, that each change in accordance with the AC period Tac. Accordingly, the dead time Td can be set to be as short as possible in accordance with the corrected current value, while the current error that changes in accordance with the AC period Tac is suppressed from causing a short circuit.

In the present embodiment, as expressed by the following equation, the dead time setting unit 36 calculates the AC period Tac [s], based on the electric-angle rotation angular velocity ω [rad/s] of the rotor. Alternatively, it may be allowed that the dead time setting unit 36 calculates the AC period Tac, based on the period at a time of zero-crossing of the current detection value or the current command value for each of the respective phases.

$$Tac = 2\pi/\omega \quad (8)$$

By use of the equations (5) through (7), the dead time setting unit 36 calculates the current-error correction value |Ierr|, based on the AC period Tac and the current amplitude Iamp. The following equation may be utilized so as to replace the equations (5) and (6).

$$Ierdlymx + Ierprmx = Iamp \times \sin\{(Tsndly + Tcnt)/Tac \times 2\pi\} \quad (9)$$

Alternatively, it may be allowed that the dead time setting unit 36 calculates the current-error correction value |Ierr| corresponding to the present AC period Tac and the present current amplitude Iamp, by referring to map data in which the relationship among the AC period Tac, the current amplitude Iamp, and the current-error correction value |Ierr| is preliminarily set. It may be allowed that instead of the map data, a mathematical expression such as a polynomial is utilized. Moreover, it may be allowed to set the map data or the mathematical expression, while considering other current-error factors than the foregoing three current-error factors.

In addition, it may be allowed that without utilizing the current amplitude Iamp, the dead time setting unit 36 calculates the current-error correction value |Ierr|, based on the AC period Tac. In this case, it may be allowed that there is calculated the current-error correction value |Ierr| under the condition of the maximum current amplitude Iamp in the operation range. It may be allowed that without utilizing the AC period Tac, the dead time setting unit 36 calculates the current-error correction value |Ierr|, based on the current amplitude Iamp. In this case, it may be allowed that there is calculated the current-error correction value |Ierr| under the condition of the minimum AC period Tac corresponding to the maximum rotation angular velocity ω in the operation range.

In the case where the control period Tcnt is variable, it may be allowed that according to the equation (6) or (9), the dead time setting unit 36 changes the current-error correction value |Ierr|, based on the control period Tcnt. In this case, the dead time setting unit 36 increases the current-error correction value |Ierr|, as the control period Tcnt increases.

2. Embodiment 2

An electric-power conversion apparatus according to Embodiment 2 will be explained with reference to the drawings. The explanations for constituent parts the same as those in foregoing Embodiment 1 will be omitted. The respective basic configurations of the electric-power converter 20 and the control apparatus 30 according to the present embodiment are the same as those of Embodiment 1; however, part of processing by the dead time setting unit 36 is different from that of Embodiment 1.

In Embodiment 1, the current-error maximum value Ierdlymx caused by the current-detection delay and the current-error maximum value Ierprmx caused by the processing delay at a time when the current for each of the respective phases approximates "0" are utilized in calculation of the current-error correction value |Ierr|.

Figure 12:
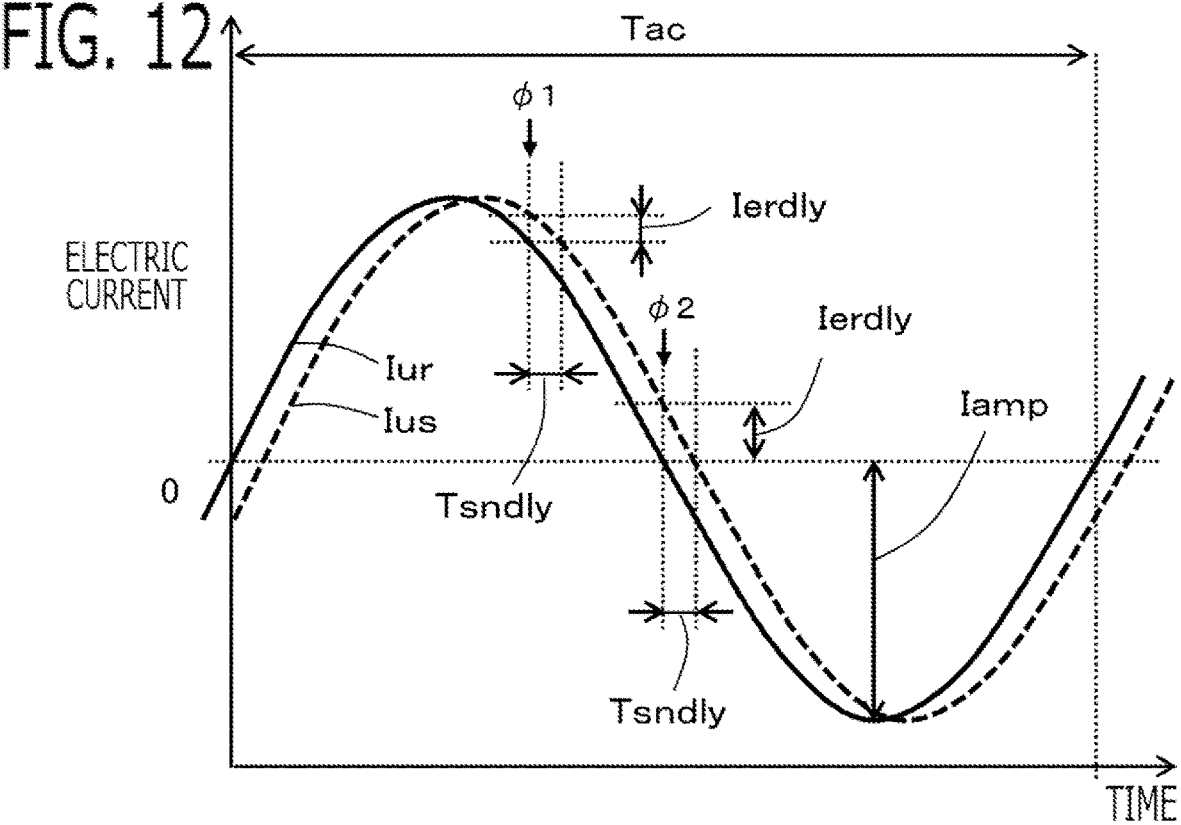
FIG. 12 is a time chart for explaining a current error caused by a current-detection delay time that changes in accordance with the phase of a current according to Embodiment 2.

However, as the current for each of the respective phases approaches the peak value, the current changing amount per unit time decreases and hence the respective current errors caused by the current-detection delay and the processing delay decrease. That is to say, the respective current errors caused by the current-detection delay and the processing delay change in accordance with the phase φ of the current for each of the respective phases in the AC period Tac. In the present embodiment, the respective current errors that change in accordance with the phase φ of the current for each of the respective phases will be considered. As represented in FIG. 12 that is similar to FIG. 9, the current error Ierdly caused by the current-detection delay at the time of the phase φ1 when the current becomes larger than "0" is smaller than that at the time of the phase φ2 when the current becomes "0".

The current error Ierdly caused by the current-detection delay can be expressed by the following equation, by use of the phase φ of the current for each of the respective phases in the AC period Tac.

$$Ierdly = Iamp \times (\sin(\varphi - Tsndly/Tac \times 2\pi) - \sin(\varphi)) \quad (10)$$

In addition, the current error Ierpr caused by the processing delay can be expressed by the following equation, by use of the phase φ of the current for each of the respective phases in the AC period Tac.

$$Ierpr = Iamp \times (\sin(\varphi - Tcnt/Tac \times 2\pi) - \sin(\varphi)) \quad (11)$$

The following equation obtained by adding the equation (10) and the equation (11) may be utilized.

$$Ierdly + Ierpr = Iamp \times [\sin\{\varphi - (Tsndly + Tcnt)/Tac \times 2\pi\} - \sin(\varphi)] \quad (12)$$

The total current error Ierall for each of the respective phases that is obtained by summing the current error Ierdly for each of the respective phases, caused by the current-detection delay, the offset-error maximum value Ieroffmx, and the current error Ierpr for each of the respective phases, caused by the processing delay, is expressed by the following equation; the current-error correction value |Ierr| for each of the respective phases can be set to the total current error Ierall. The phases p of the currents for the respective phases differ from one another; thus, the phase φ of the current for each of the respective phases is calculated, Ierdly and Ierpr are calculated based on the phase φ of the current for each of the respective phases, and then Ierall and |Ierr| for each of the respective phases are calculated.

$$Ierall = Ierdly + Ieroffmx + Ierpr$$

$$|Ierr| = Ierall \quad (13)$$

Accordingly, as is the case with Embodiment 1, the dead time setting unit 36 changes the current-error correction value |Ierr| for each of the respective phases, based on the amplitude Iamp of a current that flows in the series circuit SC for each of the respective phases (sets). Moreover, as is the case with Embodiment 1, the dead time setting unit 36 changes the current-error correction value |Ierr| for each of the respective phases, based on the AC period Tac of a current that flows in the series circuit SC for each of the respective phases (sets).

In the present embodiment, unlike Embodiment 1, the dead time setting unit 36 changes the current-error correction value |Ierr| for each of the respective phases, based on the phase φ, in the AC period Tac, of a current for each of the respective phases that flows in the series circuit SC for each of the respective phases (sets). Accordingly, unlike Embodiment 1, the current-error correction values |Ierr| for the respective phases to be utilized in calculation of the corrected current values Iswcr for the respective phases differ from one another in accordance with the phases φ of the currents for the respective phases. This configuration makes it possible to change the current-error correction value |Ierr| in accordance with the current errors Ierdly and Ierpr caused by the current-detection delay and the processing delay, respectively, that each change in accordance with the current phase φ, as explained by use of the equations (10) through (12). Accordingly, the dead time Td can be set to be as short as possible in accordance with the corrected current value, while the current error that changes in accordance with the current phase φ is suppressed from causing a short circuit.

The dead time setting unit 36 calculates the phase φ of the current for each of the respective phases, based on the current detection value or the current command value for each of the respective phases. For example, the dead time setting unit 36 calculates the phase φ of the current for each of the respective phases, based on the elapsed time from a zero-crossing time of the current detection value or the current command value for each of the respective phases to the present time and the AC period Tac. The phase φ is calculated by dividing the elapsed time by the AC period Tac and then multiplying the quotient by 2π. Alternatively, the dead time setting unit 36 calculates the phase φ of the current for each of the respective phases, based on the electric-angle rotation angle θ and the respective phases of the current vectors of the d-axis and q-axis current detection values or the d-axis and q-axis current command values.

By use of the equations (10) through (13), the dead time setting unit 36 calculates the current-error correction value |Ierr| for each of the respective phases, based on the AC period Tac, the current amplitude Iamp, and the phase φ of the current for each of the respective phases.

Alternatively, it may be allowed that the dead time setting unit 36 calculates the current-error correction value |Ierr| corresponding to the present AC period Tac, the present current amplitude Iamp, and the present phase φ of the current for each of the respective phases, by referring to map data in which the relationship among the AC period Tac, the current amplitude Iamp, the current phase φ, and the current-error correction value |Ierr| is preliminarily set. It may be allowed that instead of the map data, a mathematical expression such as a polynomial is utilized. Moreover, it may be allowed to set the map data or the mathematical expression, while considering other current-error factors than the foregoing three current-error factors.

Moreover, it may be allowed that without utilizing one of or both of the AC period Tac and the current amplitude Iamp, the dead time setting unit 36 calculates the current-error correction value |Ierr| for each of the respective phases, based on the phase φ of the current for each of the respective phases. Furthermore, in the case where the control period Tcnt is variable, it may be allowed that according to the equations (10) through (12), the dead time setting unit 36 changes the current-error correction value |Ierr| for each of the respective phases, based on the control period Tcnt.

3. Embodiment 3

Figure 13:
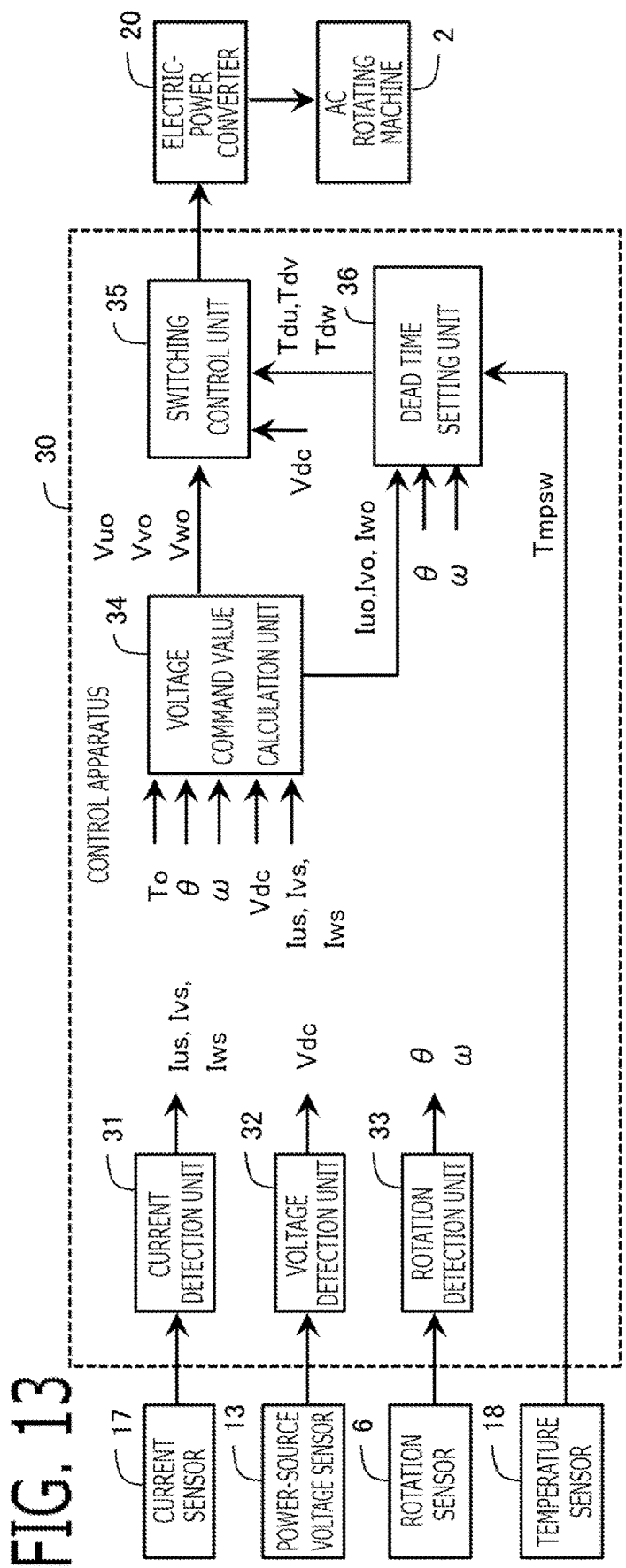
FIG. 13 is a schematic block diagram of a control apparatus according to Embodiment 3.

An electric-power conversion apparatus according to Embodiment 3 will be explained with reference to the drawings. The explanations for constituent parts the same as those in foregoing Embodiment 1 will be omitted. The respective basic configurations of the electric-power converter 20 and the control apparatus 30 according to the present embodiment are the same as those of Embodiment 1 or 2; however, part of processing by the dead time setting unit 36 is different from that of Embodiment 1 or 2. FIG. 13 is a block diagram of the control apparatus 30 according to the present embodiment.

In Embodiment 1, as represented by the equation (3), when the minimum dead time Tdmin is calculated, no temperature changes in the switching device and the peripheral circuitry thereof are taken into consideration.

Figure 14:
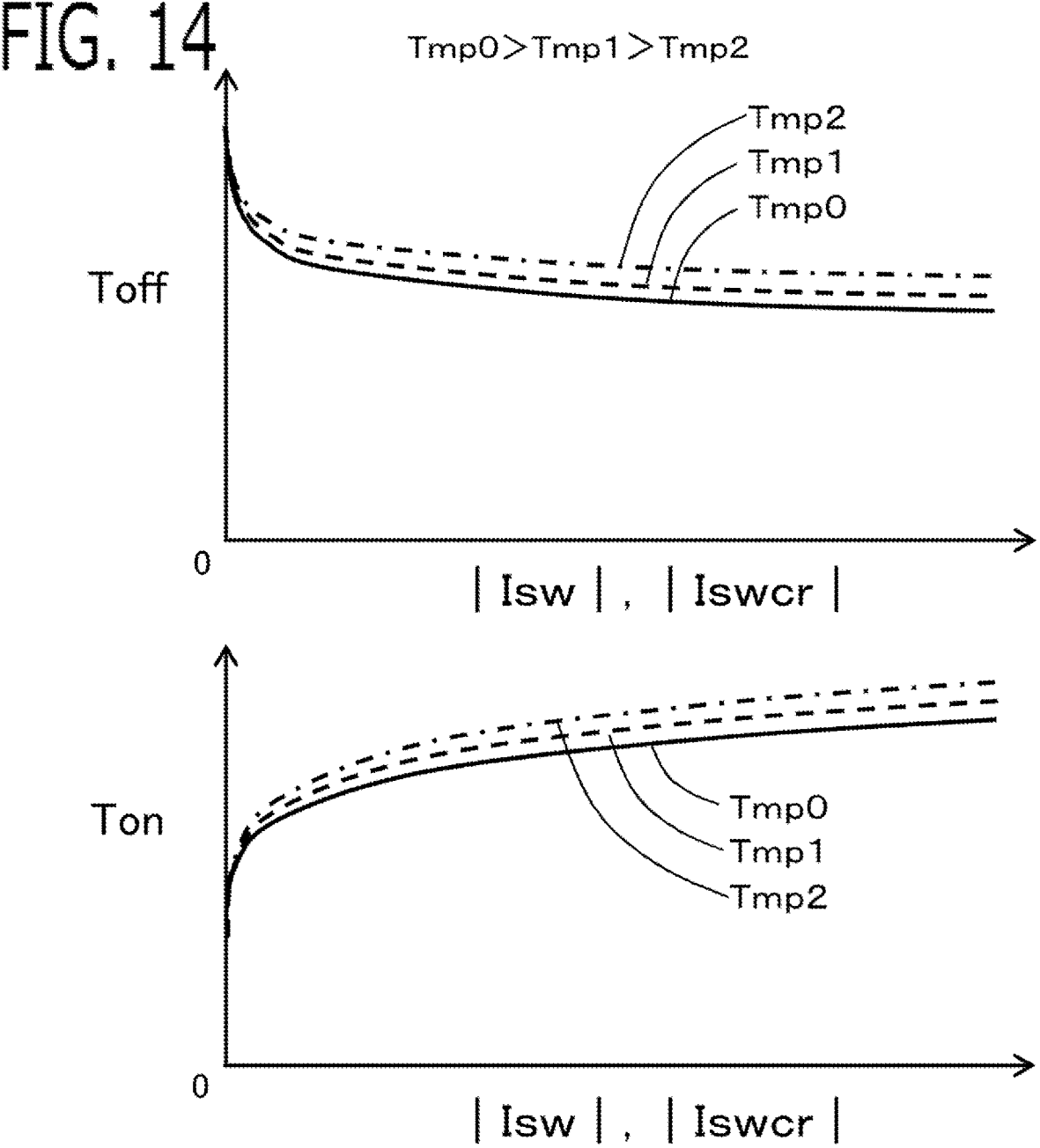
FIG. 14 is a set of charts for explaining respective current dependencies and temperature dependencies of an ON delay time and an OFF delay time according to Embodiment 3.

However, strictly speaking, as represented in FIG. 14, each of the ON delay time Ton and the OFF delay time Toff changes in accordance with the temperatures in the switching device and the peripheral circuitry thereof. The solid lines correspond to the respective characteristics in FIG. 5 of Embodiment 1. The temperature Tmp1 indicated by a broken line is lower than the temperature Tmp0 indicated by a solid line, and the temperature Tmp2 indicated by a one-dot chain line is lower than the temperature Tmp1 indicated by the broken line (Tmp0>Tmp1>Tmp2). As the temperature decreases, both the ON delay time Ton and the OFF delay time Toff increase; thus, in the minimum dead time Tdmin to be calculated by subtracting the ON delay time Ton from the OFF delay time Toff, the respective changes in the ON delay time Ton and the OFF delay time Toff, caused by the temperature change, cancel each other. However, the respective changes therein do not completely cancel each other and hence the minimum dead time Tdmin changes in accordance with the temperature.

Thus, in the present embodiment, based on temperature information Tmpsw on the switching device, the dead time setting unit 36 changes the dead time Td to be calculated based on the corrected current value Iswcr.

For example, based on the temperature information Tmpsw on the switching device, the dead time setting unit 36 changes the coefficients K1, M1, N1, K2, M2, and N2. When the coefficients K1, M1, N1, K2, M2, and N2 are calculated, map data in which the relationships between the temperature and the respective coefficients are preliminarily set, equations, or the like are utilized. In the equations below, fk1, fm1, fn1, fk2, fm2, and fn2 are functions each of which represents the map data, the equation, or the like.

$$K1 = fk1(Tmpsw), M1 = fm1(Tmpsw)$$

$$N1 = fn1(Tmpsw), K2 = fk2(Tmpsw)$$

$$M2 = fm2(Tmpsw), N2 = fn2(Tmpsw)$$

$$Toff(Iswcr) = K1 \times |Iswcr|^{M1} + N1$$

$$Ton(Iswcr) = K2 \times |Iswcr|^{M2} + N2$$

$$Tdmin(Iswcr) = Toff(Iswcr) - Ton(Iswcr)$$

$$Td(Iswcr) = Tdmin(Iswcr) \tag{14}$$

Alternatively, it may be allowed that the dead time setting unit 36 calculates the dead time Td corresponding to the calculated corrected current value Iswcr and the present temperature information Tmpsw, by referring to map data in which the relationship among the corrected current value Iswcr, the dead time Td, and the temperature information Tmpsw on the switching device is preliminarily set. The map data is preliminarily set based on an equation such as the equation (14) or experimental data. Alternatively, it may be allowed that a mathematical expression different from the equation (14) is utilized.

A temperature sensor 18 is provided at a position where the respective temperatures of the switching device and the peripheral circuitry can be detected; the output signal of the temperature sensor is inputted to the control apparatus 30. The dead time setting unit 36 detects the temperature information Tmpsw on the switching device, based on the output signal of the temperature sensor 18. Alternatively, it may be allowed that no temperature sensor is provided and that the dead time setting unit 36 calculates a heat-generation amount in the switching device and the like, based on the current command value and the voltage command value, and then estimates the temperature information Tmpsw on the switching device, based on the heat-generation amount.

4. Embodiment 4

Figure 15:
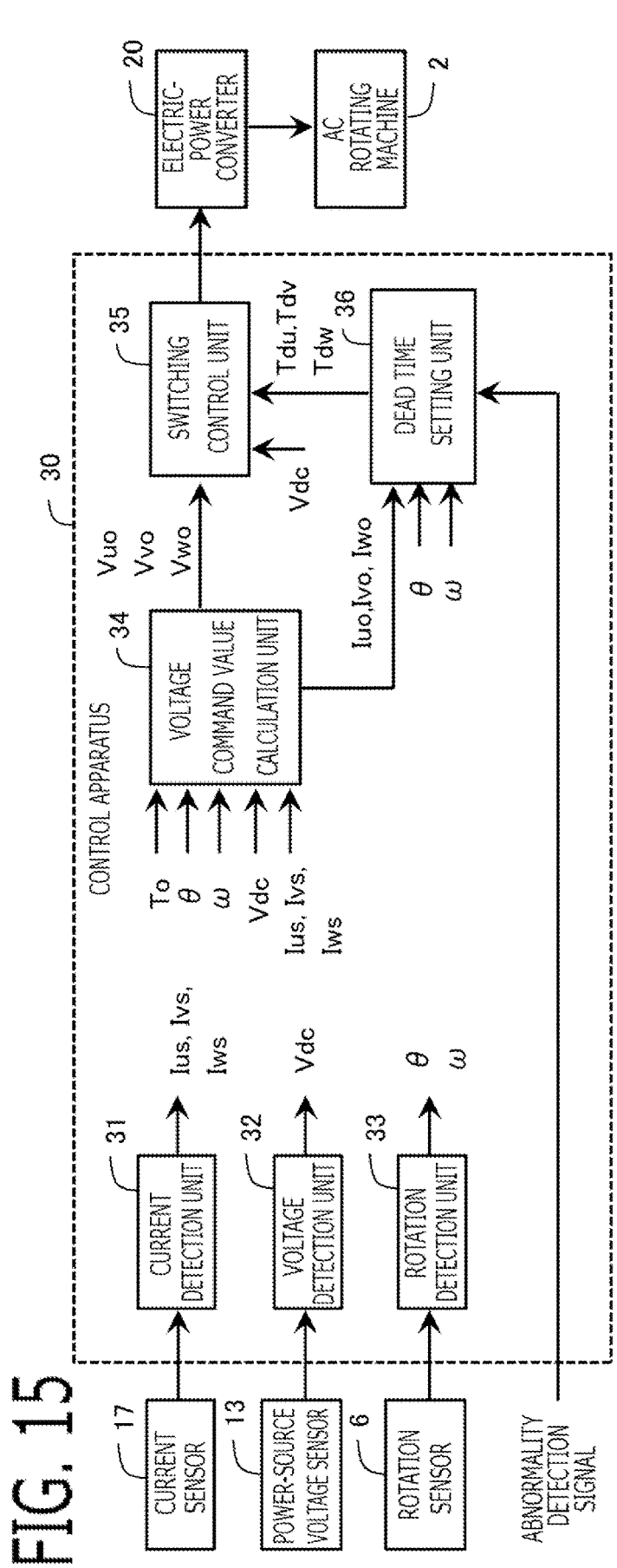
FIG. 15 is a schematic block diagram of a control apparatus according to Embodiment 4.

An electric-power conversion apparatus according to Embodiment 4 will be explained with reference to the drawings. The explanations for constituent parts the same as those in foregoing Embodiment 1 will be omitted. The respective basic configurations of the electric-power converter 20 and the control apparatus 30 according to the present embodiment are the same as those of Embodiment 1, 2, or 3; however, part of processing by the dead time setting unit 36 is different from that of Embodiment 1, 2, or 3. FIG. 15 is a block diagram of the control apparatus 30 according to the present embodiment.

In the present embodiment, when the electric-power converter 20 has an abnormality, the dead time setting unit 36 sets the dead time Td to a maximum value that can occur in the electric-power conversion apparatus.

In this configuration, when an abnormality occurs, the dead time is not shortened; therefore, when any abnormality occurs in the electric-power conversion apparatus, a further failure can be prevented, and when the electric-power conversion apparatus is in the normal operation, the dead time Td can be set and hence the setting accuracy can be raised.

In the normal operation, when the corrected current value Iswcr is "0", the dead time Td is set to the maximum value; thus, for example, when the electric-power converter 20 has an abnormality, the dead time setting unit 36 sets the corrected current value Iswcr for each of the respective phases to "0" and then sets the dead time Td for each of the respective phases, based on the corrected current value Iswcr for each of the respective phases, which is "0". Alternatively, the dead time setting unit 36 may set the dead time Td for each of the respective phases to an abnormal-time setting value that is preliminarily set.

Various kinds of publicly known methods are utilized for determining an abnormality in the electric-power converter 20. As the abnormalities in the electric-power converter 20, an excessive current, an excessive voltage, and the like are determined.

Figure 16:
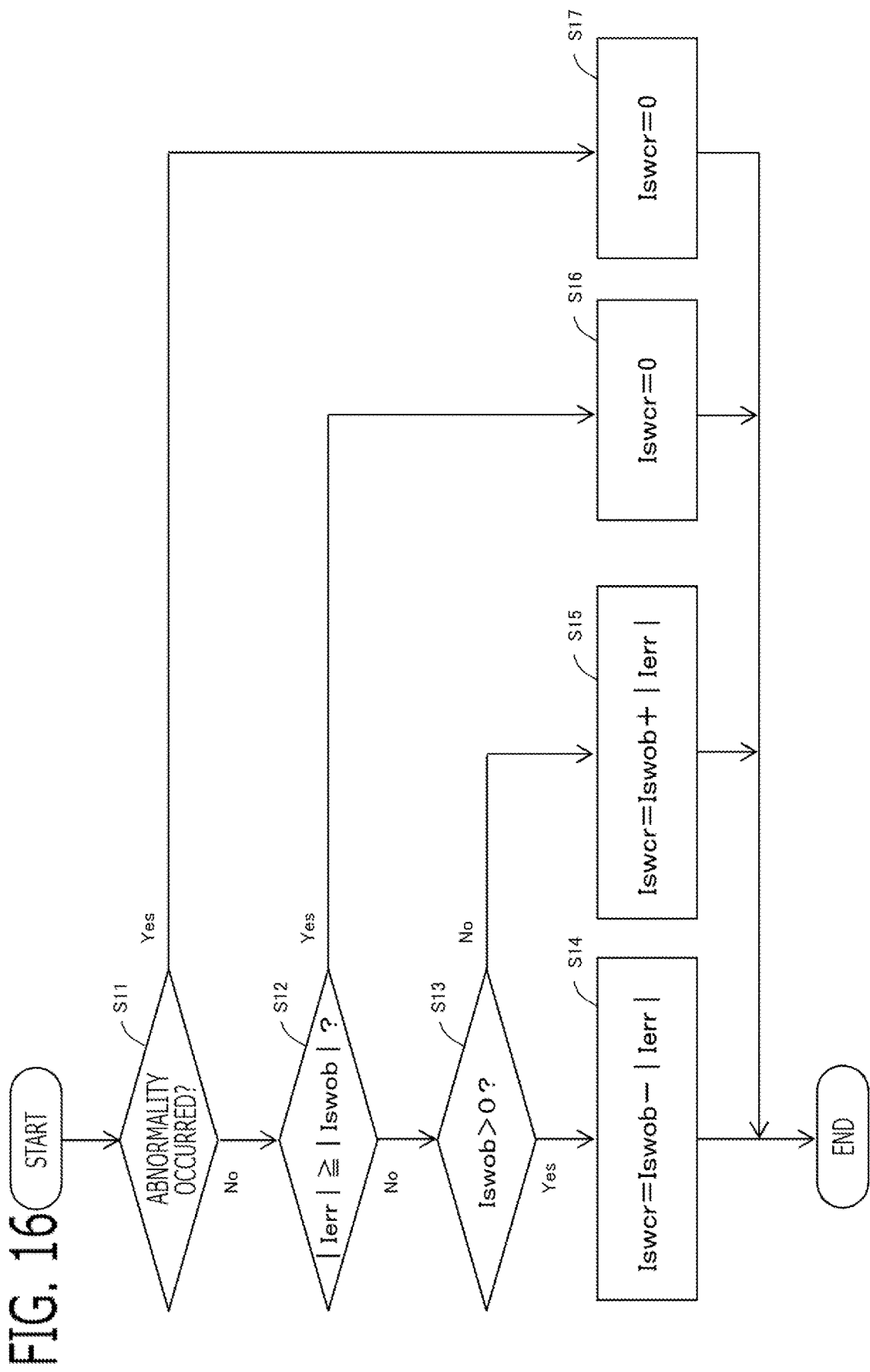
FIG. 16 is a flowchart for explaining current-value correction processing according to Embodiment 4.

The processing according to the present embodiment can be configured by the flowchart represented in FIG. 16. The processing in FIG. 16 is performed for the series circuit SC for each of the respective phases (sets); then, the corrected current value Iswcr for each of the respective phases is calculated. In the step S11, the dead time setting unit 36 determines whether or not the electric-power converter 20 has an abnormality; in the case where the electric-power converter 20 has an abnormality, the step S11 is followed by the step S17; in the case where the electric-power converter 20 has no abnormality, the step S11 is followed by the step S12. In the step S17, the dead time setting unit 36 sets the corrected current value Iswcr to "0". In addition, the processing at a time of the normal operation from the steps S12 through S16 is the same as the processing from the steps S01 through S05 in the flowchart represented in FIG. 6 of Embodiment 1; therefore, the explanation therefor will be omitted.

Application Example (1) In each of the foregoing embodiments, as an example, there has been explained the case where the AC electric power obtained through conversion by the electric-power converter 20 is supplied to the armature windings of an AC motor 2. However, it may be allowed that the AC electric power obtained through conversion by the electric-power converter 20 is either supplied to various kinds of electric loads other than the armature windings of the AC motor 2 or utilized as an AC power source.

(2) In each of the foregoing embodiments, as an example, there has been explained the case where three sets of the series circuits SC are provided in correspondence to the armature windings for the three phases. However, the electric-power converter 20 may be provided with an arbitrary plurality (other than three) of the series circuits SC. For example, it may be allowed that the electric-power converter 20 is an electric-power converter that converts single-phase AC electric power, and is provided with two sets of the series circuits SC. It may be allowed that the AC motor 2 has armature windings for four or more phases and that the electric-power converter 20 is provided with four or more sets of the series circuits SC in correspondence to the number of phases.

(3) In each of the foregoing embodiments, as an example, there has been explained the case where the DC electric power to be converted by the electric-power converter 20 is supplied from the DC power source 10. However, it may be allowed that the DC electric power to be converted by the electric-power converter 20 is supplied from any one of various kinds of electric loads.

(4) In each of the foregoing embodiments, as an example, there has been explained the case where the switching control unit 35 turns on or off the higher-potential-side switching device SP and the lower-potential-side switching device SN of the series circuit SC for the respective sets in order to control the AC motor 2 to which AC electric power is supplied. However, it may be allowed that in accordance with a subject to which AC electric power is supplied, the switching control unit 35 turns on or off the higher-potential-side switching device SP and the lower-potential-side switching device SN of the series circuit SC for the respective sets, by means of any one of various kinds of control methods.

Although the present application is described above in terms of various exemplary embodiments and implementations, it should be understood that the various features, aspects and functions described in one or more of the individual embodiments are not limited in their applicability to the particular embodiment with which they are described, but instead can be applied, alone or in various combinations to one or more of the embodiments. Therefore, an infinite number of unexemplified variant examples are conceivable within the range of the technology disclosed in the specification of the present disclosure. For example, at least one of the constituent components may be modified, added, or eliminated. At least one of the constituent components mentioned in at least one of the preferred embodiments may be selected and combined with the constituent components mentioned in another preferred embodiment.

What is claimed is:

1. An electric-power conversion apparatus comprising:
an electric-power converter that performs conversion between DC electric power and AC electric power and is provided with two or more sets of series circuits in each of which a higher-potential-side switching device connected with a higher-potential-side DC electric wire where the DC electric power flows and a lower-potential-side switching device connected with a lower-potential-side DC electric wire where the DC electric power flows are connected in series with each other and a connection point between the higher-potential-side switching device and the lower-potential-side switching device is connected with an AC electric wire where the AC electric power flows;
a switching controller that alternately turns on the higher-potential-side switching device and the lower-potential-side switching device in such a way as to sandwich a dead time, with regard to the series circuit for each of respective sets; and
a dead time setter that sets the dead time, wherein with regard to the series circuit for each of the respective sets, the dead time setter obtains information on a value of a current that flows in the series circuit; with regard to an obtained current value, the dead time setter corrects a current error caused by a phase shift between a value of an actual current that flows in the series circuit at a time when the dead time is set and the obtained current value, and calculates a corrected current value; then, the dead time setter sets the dead time, based on the corrected current value.

2. The electric-power conversion apparatus according to claim 1, wherein the dead time setter changes a current-error correction value, based on an AC period of a current that flows in the series circuit for each of the respective sets.

3. The electric-power conversion apparatus according to claim 1, wherein the dead time setter increases the current-error correction value, as an AC period of a current that flows in the series circuit for each of the respective sets decreases.

4. The electric-power conversion apparatus according to claim 1, wherein the dead time setter changes the current-error correction value, based on an obtainment delay time that is a delay time caused in obtaining information on a value of a current that flows in the series circuit.

5. The electric-power conversion apparatus according to claim 1, wherein the dead time setter increases the current-error correction value, as an obtainment delay time that is a delay time caused in obtaining information on a value of a current that flows in the series circuit increases.

6. The electric-power conversion apparatus according to claim 1, wherein the dead time setter changes the current-error correction value, based on a control period in the switching controller.

7. The electric-power conversion apparatus according to claim 1, wherein the dead time setter increases the current-error correction value, as a control period in the switching controller increases.

8. The electric-power conversion apparatus according to claim 1, wherein the dead time setter changes the current-error correction value, based on an amplitude of a current that flows in the series circuit for each of the respective sets.

9. The electric-power conversion apparatus according to claim 1, wherein the dead time setter increases the current-error correction value, as an amplitude of a current that flows in the series circuit for each of the respective sets increases.

10. The electric-power conversion apparatus according to claim 1, wherein when an amplitude of a current that flows in the series circuit for each of the respective sets is "0", the dead time setter sets a dead time to a maximum value that can occur in the electric-power conversion apparatus.

11. The electric-power conversion apparatus according to claim 1, wherein the dead time setter changes the current-error correction value for the series circuit for each of the respective sets, based on a phase, in an AC period, of a current of each of respective phases that flows in the series circuit for each of the respective sets.

12. The electric-power conversion apparatus according to claim 1, wherein the dead time setter sets the current-error correction value to a maximum value of a current-value error that can occur in an AC period.

13. The electric-power conversion apparatus according to claim 1, wherein with regard to the series circuit for each of the respective sets, the dead time setter calculates the current-error correction value of a positive value; when the obtained current value is larger than "0", the dead time setter calculates the corrected current value by subtracting the current-error correction value from the obtained current value while performing lower limiting with "0"; when the obtained current value is smaller than "0", the dead time setter calculates the corrected current value by adding the current-error correction value to the obtained current value while performing upper limiting with "0".

14. The electric-power conversion apparatus according to claim 1, wherein when the corrected current value is "0", the dead time setter sets a dead time to a maximum value that can occur in the electric-power conversion apparatus.

15. The electric-power conversion apparatus according to claim 1,
wherein the AC electric power obtained through conversion by the electric-power converter is supplied to an AC motor,
wherein the electric-power conversion apparatus controls the AC motor, and
wherein an AC period of a current that flows in the series circuit for each of the respective sets is determined by a rotation speed of the AC motor.

16. The electric-power conversion apparatus according to claim 1, wherein with regard to a relationship between the dead time and a value of a current that flows in the series circuit, the dead time setter changes the current-error correction value in such a way that the dead time becomes large in a region where the current value is small, in comparison with a region where the current value is large.

17. The electric-power conversion apparatus according to claim 1,
wherein the switching controller is provided with a current command generator that calculates a current command value, and
wherein the dead time setter obtains a current command value for the series circuit for each of the respective sets, as information on a value of a current that flows in the series circuit for each of the respective sets.

18. The electric-power conversion apparatus according to claim 1, further comprising a current detector that detects a current flowing in the series circuit, with regard to the series circuit for each of the respective sets, wherein the dead time setter obtains a current detection value of the series circuit for each of the respective sets, as information on a value of a current that flows in the series circuit for each of the respective sets.

19. The electric-power conversion apparatus according to claim 1, wherein based on temperature information on the switching device, the dead time setter changes the dead time to be calculated based on the corrected current value.

20. The electric-power conversion apparatus according to claim 1, wherein when the electric-power converter has an abnormality, the dead time setter sets the dead time to a maximum value that can occur in the electric-power conversion apparatus.

21. The electric-power conversion apparatus according to claim 1, wherein the switching device is formed by use of a wide bandgap semiconductor.

* * * * *